US012369205B2

(12) United States Patent
Suh et al.

(10) Patent No.: US 12,369,205 B2
(45) Date of Patent: Jul. 22, 2025

(54) DEVICE AND METHOD FOR MANAGING SESSION IN WIRELESS COMMUNICATION SYSTEM

(71) Applicant: Samsung Electronics Co., Ltd., Suwon-si (KR)

(72) Inventors: Kyungjoo Suh, Suwon-si (KR); Kisuk Kweon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 955 days.

(21) Appl. No.: 17/599,864

(22) PCT Filed: Mar. 30, 2020

(86) PCT No.: PCT/KR2020/004306
§ 371 (c)(1),
(2) Date: Sep. 29, 2021

(87) PCT Pub. No.: WO2020/204518
PCT Pub. Date: Oct. 8, 2020

(65) Prior Publication Data
US 2022/0210848 A1    Jun. 30, 2022

(30) Foreign Application Priority Data

Mar. 29, 2019   (KR) .................. 10-2019-0037425
Apr. 9, 2019    (KR) .................. 10-2019-0041660

(51) Int. Cl.
*H04W 4/00*   (2018.01)
*H04W 4/90*   (2018.01)
*H04W 76/11*  (2018.01)
*H04W 76/12*  (2018.01)

(52) U.S. Cl.
CPC ............ *H04W 76/12* (2018.02); *H04W 4/90* (2018.02); *H04W 76/11* (2018.02)

(58) Field of Classification Search
CPC ....... H04W 76/12; H04W 4/90; H04W 76/11; H04W 76/50; H04W 76/22; H04W 76/16
See application file for complete search history.

(56) References Cited

U.S. PATENT DOCUMENTS

2012/0094627 A1\* 4/2012 Suh .................. H04W 60/04
                                              455/404.1
2018/0152939 A1   5/2018 Lee et al.
(Continued)

FOREIGN PATENT DOCUMENTS

WO    2018/009340 A1    1/2018

OTHER PUBLICATIONS

3GPP; 3rd Generation Partnership Project; Technical Specification Group Services and System Aspects; Study on access traffic steering, switch and splitting support in the 5G system architecture (Release 16); 3GPP TR 23.793; V16.0.0; Dec. 2018; Valbonne, France.
(Continued)

*Primary Examiner* — Omoniyi Obayanju
(74) *Attorney, Agent, or Firm* — Jefferson IP Law, LLP

(57) ABSTRACT

The present disclosure relates to a $5^{th}$ generation (5G) or pre-5G communication system for supporting a higher data transfer rate beyond a $4^{th}$ generation (4G) communication system such as long term evolution (LTE). According to various embodiments, a device of user equipment (UE) in a wireless communication system may comprise at least one transceiver and at least one processor operably connected to the at least one transceiver, wherein the at least one processor is configured to: perform data communication on the basis of a first protocol data unit (PDU) session through a first access network; transmit a PDU session establishment request message for generating a second PDU session, to the network entity of a session management function (SMF) through a second access network; receive a PDU session (Continued)

establishment accept message from the network entity of the SMF; and perform data communication on the basis of the first PDU session and the second PDU session according to the PDU session establishment accept message, wherein the first access network comprises one of 3rd generation partnership project (3GPP) access and non-3GPP access, and the second access network comprises the remaining one of the 3GPP access and non-3GPP access.

16 Claims, 6 Drawing Sheets

(56) References Cited

U.S. PATENT DOCUMENTS

| | | |
|---|---|---|
| 2019/0090298 A1 | 3/2019 | Abraham et al. |
| 2019/0182655 A1* | 6/2019 | Gupta ................ H04W 12/102 |
| 2019/0260811 A1* | 8/2019 | Kim ..................... H04W 76/12 |
| 2019/0274178 A1* | 9/2019 | Salkintzis ......... H04W 28/0268 |

OTHER PUBLICATIONS

3GPP; 3rd Generation Partnership Project; Technical Specification Group Core Network and Terminals; Non-Access-Stratum (NAS) protocol for 5G System (5GS); Stage 3 (Release 15); 3GPP TS 24.501; V15.2.1; Jan. 2019; Valbonne, France.

3GPP; 3rd Generation Partnership Project; Technical Specification Group Services and System Aspects; Procedures for the 5G System; Stage 2 (Release 16); 3GPP TS 23.502; V16.0.0; Mar. 2019; Valbonne, France.

Zte, How to establish the user plane resource in second access for MA-PDU session, S2-1901989, 3GPP TSG-SA WG2 Meeting #131, Feb. 19, 2019.

Motorola Mobility et al., Introduction of ATSSS Support, S2-1902249, SA WG2 Meeting #131, Feb. 28, 2019.

Korean Office Action dated Jan. 8, 2025, issued in Korean Application No. 10-2019-0041660.

* cited by examiner

DEVICE AND METHOD FOR MANAGING SESSION IN WIRELESS COMMUNICATION SYSTEM

TECHNICAL FIELD

The disclosure relates generally to a wireless communication system, and more particularly, to an apparatus and a method for managing a session in a wireless communication system.

BACKGROUND ART

Efforts to develop enhanced 5th generation (5G) communication systems or pre-5G communication systems have been ongoing in order to meet the increasing demand for wireless data traffic since 4th generation (4G) communication systems were commercialized. For this reason, the 5G communication systems or pre-5G communication systems are called Beyond 4G network communication systems or post long term evolution (LTE) systems.

The 5G communication system is considered to be implemented in a superhigh frequency (mmWave) band (for example, 60 GHz band) to achieve a high data transmission rate. For the 5G communication systems, technologies for beamforming, massive multiple input multiple output (MIMO), full dimensional MIMO (FD-MIMO), array antenna, analog beam-forming, and large scale antenna are being discussed to mitigate a path loss of a radio wave and to increase a transmission distance of a radio wave in the superhigh frequency band.

In addition, technologies for evolved small cells, enhanced small cells, cloud ratio access network (RAN), ultra-dense network, device to device communication (D2D), wireless backhaul, moving network, cooperative communication, coordinated multi-points (CoMP), and interference cancellation in the 5G communication systems are developing to enhance networks of systems.

In addition, hybrid frequency shift keying and quadrature amplitude modulation (FQAM) and sliding window superposition coding (SWSC), which are advanced coding modulation (ACM) methods, and filter bank multi carrier (FBMC), non-orthogonal multiple access (NOMA), and sparse code multiple access (SCMA) which are enhanced accessing technology in the 5G systems are developing.

In $3^{rd}$ generation partnership project (3GPP), a core network for accommodating an access network of 3GPP provides an interface to accommodate not only the access network of the 3GPP but also an access network of non-3GPP.

DISCLOSURE OF INVENTION

Technical Problem

Based the above-described discussion, the disclosure provides an apparatus and a method for managing a session by using a non-access stratum (NAS) protocol in a wireless communication system.

In addition, the disclosure provides an apparatus and a method for splitting a session and managing an access network for the split session in a wireless communication system.

Solution to Problem

According to various embodiments of the disclosure, an operating method of a terminal (user equipment (UE)) in a wireless communication system may include a process of performing data communication based on a first protocol data unit (PDU) session on a first access network, a process of transmitting a PDU session establishment request message for generating a second PDU session on a second access network to a network entity of a session management function (SMF), a process of receiving a PDU session establishment accept message from the network entity of the SMF, and a process of performing data communication based on the first PDU session and the second PDU session, based on the PDU session establishment accept message, and the first access network may include one of a $3^{rd}$ generation partnership project (3GPP) access and a non-3GPP access, and the second access network may include the other one of the 3GPP access and the non-3GPP access.

According to various embodiments of the disclosure, an operating method of an entity providing a session management function (SMF) in a wireless communication system may include a process of performing data communication with a terminal (user equipment (UE)), based on a first protocol data unit (PDU) session on a first access network, a process of receiving a PDU session establishment request message for generating a second PDU session on a second access network from the terminal, a process of transmitting a PDU session establishment accept message from the network entity of the SMF to the terminal, and a process of performing data communication with the terminal, based on the first PDU session and the second PDU session, based on the PDU session establishment accept message, and the first access network may include one of a $3^{rd}$ generation partnership project (3GPP) access and a non-3GPP access, and the second access network may include the other one of the 3GPP access and the non-3GPP access.

According to various embodiments of the disclosure, an apparatus of a terminal (user equipment (UE)) in a wireless communication system may include at least one transceiver and at least one processor operatively coupled with the at least one transceiver, and the at least one processor may be configured to perform data communication based on a first protocol data unit (PDU) session on a first access network, to transmit a PDU session establishment request message for generating a second PDU session on a second access network to a network entity of a session management function (SMF), to receive a PDU session establishment accept message from the network entity of the SMF, and to perform data communication based on the first PDU session and the second PDU session, based on the PDU session establishment accept message, and the first access network may include one of a $3^{rd}$ generation partnership project (3GPP) access and a non-3GPP access, and the second access network may include the other one of the 3GPP access and the non-3GPP access.

According to various embodiments, an apparatus of an entity providing a session management function (SMF) in a wireless communication system may include at least one transceiver and at least one processor operatively coupled with the at least one transceiver, and the at least one processor may be configured to perform data communication with a terminal (user equipment (UE)), based on a first protocol data unit (PDU) session on a first access network, to receive a PDU session establishment request message for generating a second PDU session on a second access network from the terminal, to transmit a PDU session establishment accept message from the network entity of the SMF to the terminal, and to perform data communication with the terminal, based on the first PDU session and the second PDU session, based on the PDU session establishment accept message, and the first access network may include one of a 3$^{rd}$ generation partnership project (3GPP) access and a non-3GPP access, and the second access network may include the other one of the 3GPP access and the non-3GPP access.

Advantageous Effects of Invention

According to various embodiments of the disclosure, the apparatus and the method can perform communication efficiently by splitting a session by using a non-access stratum (NAS) protocol between an entity of a 5G core network and a terminal (user equipment (UE)), and managing the split session.

The effect achieved in the disclosure is not limited to those mentioned above, and other effects that are not mentioned above may be clearly understood to those skilled in the art based on the description provided below.

BEST MODE FOR CARRYING OUT THE INVENTION

Figure 1:
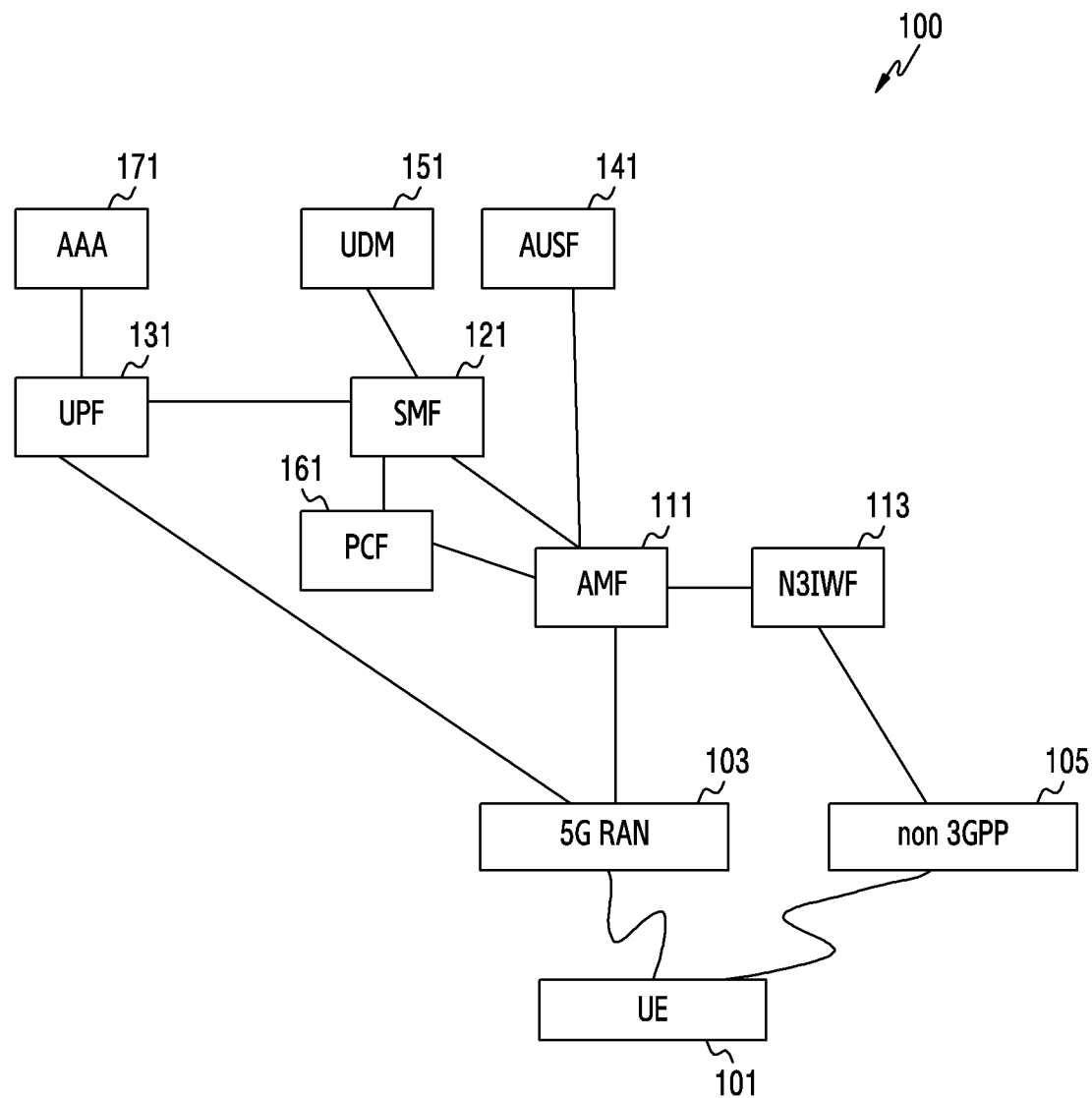
FIG. 1 is a view illustrating an example of a network environment according to various embodiments of the present disclosure.

Hereinafter, preferred embodiments of the disclosure will be described in detail with reference to the accompanying drawings. It should be noted that the same components are indicated by the same reference numerals in the accompanying drawings if possible. In addition, detailed descriptions of well-known functions and configurations will be omitted since they would unnecessarily obscure the subject matters of the disclosure.

In explaining embodiments of the disclosure, descriptions of technology that is well known in the technical field to which the disclosure belongs and is not directly related to the disclosure will be omitted. This is to convey the subject matters of the disclosure more clearly without obscuring, by omitting redundant explanations.

In the same reason, some components in the accompanying drawings may be exaggerated, omitted, or schematically illustrated. In addition, the size of each component does not completely reflect a real size. In each drawing, the same reference numerals are given to the same or matching components.

Advantages and features of the disclosure and methods for achieving the same will be clarified by referring to embodiments, which will be described below in detail along with the accompanying drawings. However, the disclosure is not limited to embodiments disclosed hereinbelow, and may be embodied in many different forms and are provided so that the disclosure will be thorough and complete, and will fully convey the scope of the disclosure to those of ordinary skill in the art. Throughout the detailed descriptions, the same reference numerals indicate the same components.

As used herein, a term identifying an access node, terms indicating network entities, terms indicating messages, a term indicating an interface between network entities, terms indicating a variety of identification information, etc. are merely examples for convenience of explanation. Accordingly, the disclosure is not limited the terms described below, and other terms indicating objects having the same technical meanings may be used.

In addition, the disclosure describes various embodiments by using terms that are used or defined in some communication standards (for example, 3$^{rd}$ generation partnership project (3GPP)), but these terms are merely examples. That is, the disclosure is not limited by the terms and names, and various embodiments of the disclosure may be easily modified and applied to other communication systems.

That is, in explaining embodiments of the disclosure in detail, communication standards defined by 3GPP will be mainly described, but the important subject matters of the disclosure can be applied to other communication systems having similar technical backgrounds, with some changes, without departing from the scope of the disclosure, and this can be implemented by determination of those skilled in the technical field of the disclosure.

Terms used in the disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the specification, they should not be interpreted as excluding embodiments of the disclosure.

In various embodiments of the disclosure described below, hardware-wise approach methods will be described by way of an example. However, various embodiments of the disclosure include technology using both hardware and software, and thus do not exclude software-based approach methods.

The disclosure described hereinbelow relates to a method for managing, processing a session through non-access stratum (NAS) signaling in managing and splitting the session in a next-generation 5G communication environment, or an apparatus performing such a function. Specifically, the disclosure describes technology for managing a session for each access network on a core network that accommodates all of a 3GPP access network and a non-3GPP access network.

As the 5G mobile communication network is introduced, an access and mobility management function (AMF), which is a management entity for managing mobility of a terminal, and a session management function (SMF), which is an entity for managing a session, are separated. Accordingly, unlike in an existing communication system (for example, a 4G LTE communication system) in which an operation method is managed by a mobile management entity (MME), the entity for managing mobility and the entity for managing a session are separated, and a communication method and a communication management method between a terminal and a network entity are changed.

As 5G communication is realized, mobility management is performed with respect to non-3GPP access by the AMF via a non-3GPP inter-working function (N3IWF), and session management is performed through the SMF. In addition, not only mobility management but also security-related information, which is an important element, is dealt with by the AMF. On the other hand, in a 4G communication system (for example, LTE), mobility management and session management are performed by the MME.

In a 5G communication system (for example, NR), there may exist a form of an independent structure (stand alone (SA)) of the 5G communication system, and also, there may exist entities for the 4G communication system and the 5G communication system, and there may exist a form of a non-independent structure (non-stand alone (NSA)) that supports 5G communication by using some of the entities of the 4G communication system when 5G communication is performed.

Hereinafter, the disclosure suggests an apparatus and a method for splitting a session and managing the session by using a non access stratum (NAS) protocol in a 5G communication system. Through efficiency of session management according to various embodiments of the disclosure, communication performance can be enhanced. The 5G communication system of the disclosure may include a communication environment in the form of SA. In addition, the 5G communication system of the disclosure may include a communication environment in the form of NSA.

FIG. 1 illustrates an example 100 of a network environment according to various embodiments of the disclosure. Through FIG. 1, a terminal, network entities for splitting, managing a session in a 5G network will be described. The network environment may be referred to as a communication system.

Referring to FIG. 1, the communication system, which is a communication system forming a 5G network, may include a user plane function (UPF) 131, a session management function (SMF) 121, an access and mobility management function (AMF) 111, a 5G radio access network (RAN) 103, a user data management (UDM) 151, a policy control function (PCF) 161. In addition, the communication system may include an authentication server function (AUSF) 141, authentication, authorization and accounting (AAA) 171 to authenticate each entity.

UE 101 may perform communication through a wireless channel formed with a base station (for example, eNB, gNB), that is, an access network. In some embodiments, the UE 101 is a device that is used by a user, and may be a device configured to provide a user interface (UI). For example, the UE 101 may be a terminal (equipment) that is mounted in a vehicle for driving. In some other embodiments, the UE 101 may be a device that performs machine type communication (MTC) operating without intervention by a user, or may be an autonomous vehicle. The UE 101 may be indicated by a 'terminal', a 'vehicle terminal', 'user equipment (UE)', a 'mobile station', a 'subscriber station', a 'remote terminal', a 'wireless terminal', or a 'user device', or other terms having the same technical meanings as the above-mentioned terms, in addition to an electronic device.

The 5G RAN 103, which is a radio access network, may provide a wireless channel for connecting to a 5G core network. The 5G RAN may provide radio access to the UE 101 through the same base station. The base station is a network infrastructure that provides radio access to the UE 101. The base station has a coverage that is defined as a predetermined geographical region, based on a distance by which a signal can be transmitted. The base station may be indicated by an 'access point (AP)', an 'eNodeB (eNB)', a 'wireless point', a '5th generation (5G) node', a '5G NodeB (SGNB)', a gNodeB (gNB)', a 'wireless point', a 'transmission/reception point (TRP)', an 'access unit', a 'distributed unit (DU)', a radio unit (RU)', a 'remote radio head (RRH)', or other terms having the same technical meanings as the above-mentioned terms, in addition to the base station.

The AMF 111 may provide a function for access and mobility management on the basis of UE, and basically, one AMF may be connected to one UE. Specifically, the AMF 111 may perform at least one function of signaling between core network nodes for mobility between 3GPP access networks, a CP interface (N2 interface) between radio access networks (for example, 5G RANs 103), NAS signaling with the UE 101, identification of the SMF 121, delivering a session management (SM) message between the UE 101 and the SMF 121. Some or all functions of the AMF may be supported within a single instance of one AMF.

The SMF 121 may provide a session management function, and, when the UE 101 has a plurality of sessions, the sessions may be managed by different SMAFs. Specifically, the SMF 121 may perform at least one function of session management (for example, session establishment, modification, and release including maintenance of a tunnel between the UPF 131 and an access network node), selection and control of an UP function, configuration of traffic steering for routing traffic to an appropriate destination in the UPF, termination of an SM part of an NAS message, downlink data notification, an initiator of AN-specific SM information (transmission to an access network through an N2 interface via the AMF). Some or all functions of the SMF may be supported within a single instance of one SMF.

The UE 101 may transmit a message or may receive a message through NAS signaling with the AMF 111 and the SMF 121. The NAS signaling may refer to signaling between a terminal and a core network in an evolved packet system (EPS), a 5G system (5GS) protocol stack, a functional stratum for exchanging a traffic message. On an NAS stratum, the UE 101 may transmit a message to a network entity or may receive a message from the network entity via a base station (for example, gNB). In this case, the base station may not interpret a corresponding message and may transmit the message to the UE 101 or the network entity. Through NAS signaling, mobility of the UE 101 may be supported and a session management procedure may be supported.

When the UE 101 performs communication through the non-3GPP access 105, the non-3GPP access 105 may refer to an access network other than an access network (for example, a cellular network, the 5G RAN 103) that is formed through an entity defined in 3GPP, such as eNB or gNB. For example, the non-3GPP access 105 may include a wireless short-range access network (wireless local area network (WLAN)). The communication system may include an N3 interworking function (N3IWF) 113. The non-3GPP access 105 may connect to a 5G core network (for example, the AMF 111) via the N3IWF 113. When communication is performed by using the non-3GPP access 105, session management may be controlled by the UE 101, the non-3GPP access 105, the N3IWF 113, the SMF 121, and mobility management may be controlled by the UE, the non-3GPP access 105, the N3IWF 113, the AMF 111.

In the 5G network, the entity (for example, the AMF) for mobility management and the entity (for example, SMF) for session management are separated. The communication system according to various embodiments of the disclosure may include a stand alone (SA) deployment structure which performs communication only with 5G communication entities, or may include a non stand alone (NSA) deployment structure which uses 4G entities and 5G entities for 5G communication. Hereinbelow, the disclosure assumes the 5G communication network, but, if the same concept is applied to other systems within the scope that can be understood by those skilled in the art, the same concept can be applied. Accordingly, FIG. 1 illustrates an example of the 5G RAN 103, but the UE 101 may connect to the core network through a 4G RAN including eNB. The core network may be a 5G core network and may include the AMF 111, the SMF 121 as a 5G core network.

(Method 1)

Figure 2:
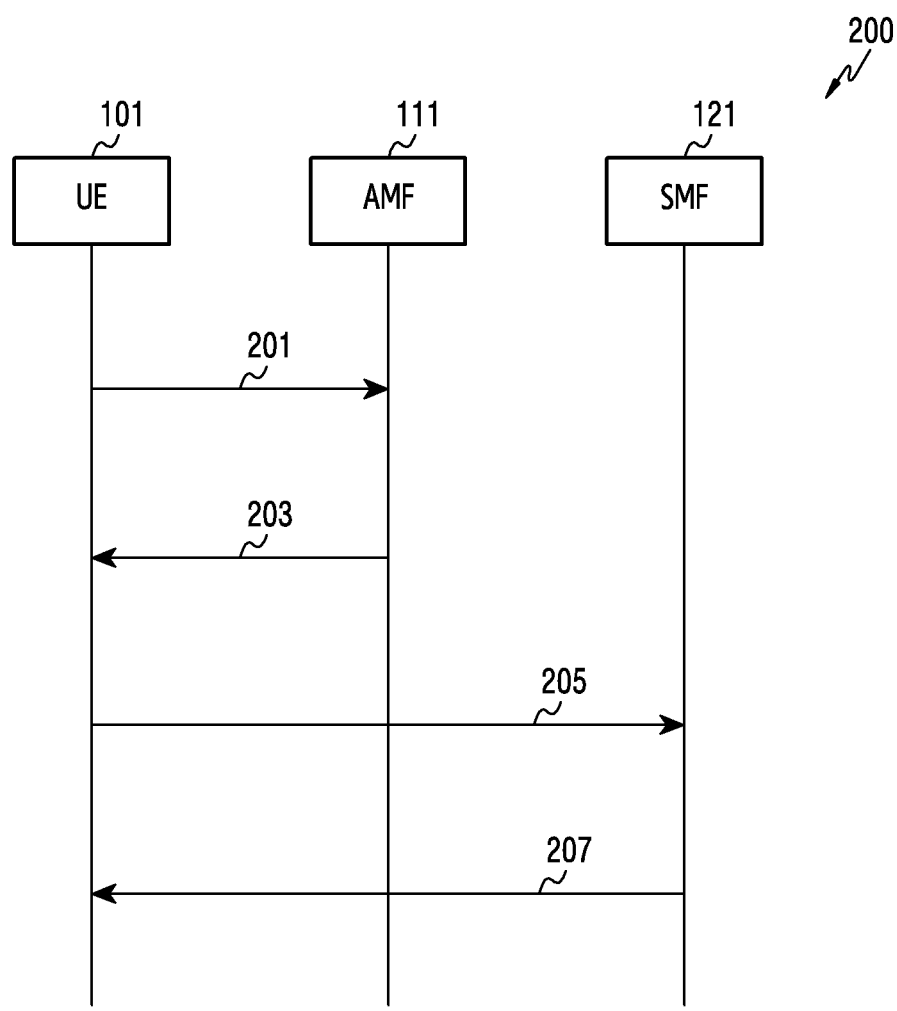
FIG. 2 is a view illustrating an example of NAS signaling for session management according to various embodiments of the disclosure.

FIG. 2 illustrates an example 200 of NAS signaling for session management according to various embodiments of the disclosure. Through FIG. 2, embodiments regarding a communication procedure, method through splitting of a session, session management, processing through an NAS protocol in a 5G network environment will be described. The session may include a protocol data unit (PDU) session. The PDU session refers to a connection or association between UE and a data network which provide a service by exchanging PDUs. The NAS protocol may include signaling between UE and an AMF or signaling between UE and an SMF. The UE exemplifies the UE 101 of FIG. 1. The AMF exemplifies the AMF 111 of FIG. 1. The SMF exemplifies the SMF 121 of FIG. 1.

Referring to FIG. 2, at step 201, the UE may transmit a registration request (registration request message) to the AMF. The AMF may receive the registration request message from the UE.

At step 203, the AMF may transmit a registration response message to the UE. The UE may receive the registration response message from the AMF.

At step 205, the UE may transmit a PDU session establishment request message to the SMF via the AMF. The PDU session establishment request message that the UE transmits to the SMF may be transmitted via the AMF, but the AMF may interpret the message received from the UE, that is, the PDU session establishment request message. The AMF may transmit the PDU session establishment request message received from the UE to the SMF. The AMF may identify the SMF which will receive the PDU session establishment request message. The AMF may transmit the PDU session establishment request message to the identified SMF.

According to various embodiments, a request type may be indicated as a split to split a session. For example, when a session exists on a certain access, but a new session is generated on another access and the request type is indicated as a split, the session may be split.

According to an embodiment, indication information of 1 bit may be considered as a method for indicating another access type. For example, the indication information may be used to discriminate between two accesses by allocating 1 to a 3GPP access and allocating 0 to a non-3GPP access. In addition, in another example, the indication information may be used to discriminate between the two accesses by allocating 0 to the 3GPP access and allocating 1 to the non-3GPP access.

The indication information may be used to split a session to another access, not an access currently communicating, and to notify this. For example, when communication is performed with the 3GPP access, the indication information may indicate to split the session to the non-3GPP access. In another example, when communication is performed with the non-3GPP access, the indication information may indicate to split the session to the 3GPP access.

According to another embodiment, a method for indicating a current access type to inform an access currently communicating may be considered. The indication information may include information for indicating an access currently communicating. For example, when the UE communicates on the 3GPP access at step 201, step 203, and additionally, communication is performed by generating a session on the non-3GPP access and splitting each session, the indication information may include information indicating the 3GPP access. In addition, in another example, a reversed case is possible. When the UE communicates on the non-3GPP access at step S201, step 203, and additionally, communication is performed by generating a session on the 3GPP access and splitting each session, the indication information may include information indicating the non-3GPP access.

Splitting a session according to various embodiments may differ from switching a session to another access when handover occurs during communication through a certain access or a wireless state is degraded and communication is not smoothly performed on the corresponding access. Hereinafter, specific examples of indication information for splitting a session will be described.

According to various embodiments, UL NAS transport may be used to split a PDU session. The UE may transmit a UL NAS transport message to the AMF. For example, the UE may transmit the UL NAS transport message to a network through a gNB of a 5G RAN or an eNB of a 4G RAN. The gNB or eNB may transmit the message received from the UE to the AMF without processing the message. For example, the UL NAS transport may be configured as shown in table 1 presented below:

TABLE 1

UL NAS transport

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | UL NAS TRANSPORT message identity | Message type | M | V | 1 |
| | Payload container type | Payload container type | M | V | ½ |
| | Spare half octet | Spare half octet | M | V | ½ |
| | Payload container | Payload container | M | LV-E | 3-65537 |
| | PDU session ID | PDU session identity 2 | C | TV | 2 |
| | Old PDU session ID | PDU session identity 2 | O | TV | 2 |
| | Request type | Request type | O | TV | 1 |
| | S-NSSAI | S-NSSAI | O | TLV | 3-10 |
| | DNN | DNN | O | TLV | 3-102 |
| | Additional information | Additional information | O | TLV | 3-n |
| | additional access type | additional access type | O | TV | |
| | access type | access type | O | TV | |

According to various embodiments, when the UE transmits the above-described UL NAS transport message to the AMF, the UE may configure the request type as shown in table 6 presented below. The request type may indicate a PDU session split request or a multiple access PDU session request, Access Traffic Steering, Switching, Splitting request/supported. The UE may use the request type of the UL NAS transport message in order to indicate a request of a function of the PDU session split request or multiple access PDU session request, Access Traffic Steering, Switching, or Splitting request/supported.

In addition, according to an embodiment, the UL NAS transport message transmitted from the UE to the AMF may include a PDU session establishment message. For example, the UE may include the PDU session establishment message in the payload container of the UL NAS transport message, and may transmit the UL NAS transport message. The UE may transmit the request type of the UL NAS transport message as defined in table 6, while including the PDU session establishment message, transmitted from the UE to the SMF, in the UL NAS transport message and transmitting. That is, the UE may transmit the UL NAS transport message which includes the PDU session establishment message and the request type of which indicates the PDU session split request or multiple access PDU session request, Access Traffic Steering, Switching, Splitting request/supported. According to various embodiments, one request type value may indicate the above-described functions/requests as shown in table 6. According to another embodiment, some functions may be separated and indicated through a separate request type value. Specifically, the request type indicating a split request may refer to not only requesting the PDU session to be split, but also additionally requesting a PDU session function through multiple accesses (multiple access PDU session request) or requesting a function of adjusting (sharing, splitting, adjusting, balancing) access traffic.

The UL NAS transport message may be transmitted between the UE and the AMF. The message between the UE and the AMF, that is, the UL NAS transport message, may include the PDU session establishment message to be transmitted to the SMF. That is, the message between the UE and the AMF may be configured in the form of UL NAS transport ([PDU session establishment message], request type, PDU session ID (identity), additional access type/access type). The request type may indicate whether the corresponding PDU session establishment message is an initial request or a multiple PDU session request, split. In addition, a corresponding PDU session ID may indicate whether the PDU session requests a multiple access PDU session with respect to another access type by a split, multiple access PDU session request. In addition, by additionally including an additional access type/access type and transmitting, an access for making a multiple access PDU session may be informed in one embodiment (case 1), or a current access type may be indicated in another embodiment (case 2). In other words, an information element (IE) added to the UL NAS transport message may indicate a target access or may indicate a current access type. For example, the UL NAS transport message may include at least one of an additional access type IE or an access type IE. According to an embodiment, the additional access type, the access type may be configured as shown in tables 14, 15, 16, 16-1. Table 1 illustrates that the UL NAS transport message includes the additional access type IE and the access type IE, but the UL NAS transport message including only one of the two IEs, and indicating a type of the target access or a current access type may be understood as an embodiment of the disclosure. The IE included in the UL NAS transport may be expressed by additional access type/access type.

The PDU session ID included in the PDU session establishment message may indicate a PDU session ID that wants a multiple access PDU session. According to various embodiments, cases where the same PDU session ID as the PDU session ID included in the PDU session establishment message is transmitted may be configured as follows:

Case 1): When a PDU session transmitted in 3GPP is first established, the case of a multiple PDU session transmitted on the non-3GPP access implies that the same PDU session is transmitted. That is, when a PDU session related to 3GPP is first established, a PDU session ID included in a message for the multiple PDU session (for example, a PDU session establishment message) transmitted on the non-3GPP access may be identical to the PDU session ID of the 3GPP.

Case 2): In the other case, when a PDU session transmitted in non-3GPP is first established, the case of a multiple PDU session transmitted on the 3GPP access implies that the same PDU session is transmitted. That is, unlike in Case 1, when the PDU session related to non-3GPP is first established, a PDU session ID included in a message for the multiple PDU session (PDU session establishment message) transmitted on the 3GPP access may be identical to the PDU session ID of the non-3GPP.

In addition, this embodiment may be applied in Case 1) where the 3GPP and the non-3GPP use the same AMF, the same public land mobile network (PLMN), and in Case 2) where the 3GPP and the non-3GPP use different AMFs, different PLMNs. That is, the UE may inform the AMF that the multiple PDU session is requested even when there is a PDU session, through the request type, regardless of whether the AMF, the PLMN are the same or different. When the AMF receives this request from the UE, the AMF may perform mapping to find an SMF capable of dealing with the corresponding PDU session and to find the SMF in charge of processing the corresponding PDU session, regardless of whether the PLMN is different or is the same. That is, the AMF may identify an SMF capable of managing the corresponding PDU session, regardless of the PLMN of the message including the request, and may associate the UE and the SMF.

The SMF may be synchronized with the UE. The SMF may manage a PDU session ID which is managed as a multiple PDU session in the UE, as a multiple PDU session. In addition, since the AMF should select (or identify) an appropriate corresponding SMF, the AMF may manage information regarding the multiple PDU session ID. The AMF may select an appropriate SMF and may transmit the PDU session establishment message, and, with respect to a message transmitted from the SMF to the UE, may find UE which has requested the multiple access PDU session with respect to the corresponding PDU session ID, and may transmit a response to the multiple access PDU session. According to various embodiments, the AMF may identify an SMF capable of managing the multiple PDU session ID, and may transmit the PDU session establishment to the identified SMF. According to various embodiments, the AMF may identify UE that has transmitted a request, based on a response message received from the SMF, and may transmit, to the UE, a response transmitted from the SMF to the UE. In addition, the AMF may transmit a message received from the SMF to the identified UE.

The above-described UL NAS transport message may be transmitted from the UE to the AMF, and in this case, the request type may be requesting the PDU session to be split as shown in table 2. In this case, a message for requesting the PDU session split is a PDU session split message. The PDU session split message is a message that is transmitted from the UE to the SMF, and is a message that is transmitted from the UE to the SMF via the AMF. That is, the UE according to various embodiments may transmit the PDU session split message to the SMF. The SMF may receive the PDU session split message from the UE.

TABLE 2

PDU session split Request message

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION Split REQUEST message identity | Message type | M | V | 1 |
| | 5GSM capability | 5GSM capability | O | TLV | 3-15 |
| | 5GSM cause | 5GSM cause | O | TV | 2 |
| | Maximum number of supported packet filters | Maximum number of supported packet filters | O | TV | 3 |
| | Always-on PDU session requested | Always-on PDU session requested | O | TV | 1 |
| | Integrity protection maximum data rate | Integrity protection maximum data rate | O | TV | 3 |
| | Requested QoS rules | QoS rules | O | TLV-E | 7-65538 |
| | Requested QoS flow descriptions | QoS flow descriptions | O | TLV-E | 5-65538 |
| | Mapped EPS bearer contexts | Mapped EPS bearer contexts | O | TLV-E | 7-65538 |
| | Extended protocol configuration options | Extended protocol configuration options | O | TLV-E | 4-65538 |
| | Access type | | O | | |

A case where the PDU session split message described above is used may be a case where an existing PDU session already exists. That is, when there exists a PDU session, the UE may transmit a message for requesting a PDU session split to the SMF. Accordingly, a PDU session ID may indicate an identity of a PDU session which wants to be split.

The PDU session split message may include information indicating an access type. The information indicating the access type may be an information element (IE) that is used for indicating another access that wants to split the PDU session.

According to various embodiments, the PDU session establishment request message may be used to split the PDU session. For example, the PDU establishment request message may be configured as shown in table 2. When the PDU session establishment request message is used to split the PDU session, it may be informed through an additional access information element that establishment of the PDU session is not initially requested, and establishment is requested for another access to split the existing PDU session. That is, the PDU session establishment request message may additionally include information indicating addition of a PDU session according to a new access. In addition, according to an embodiment, the network may be informed through a split request information element that the request is made to split the PDU session

TABLE 3

PDU session establishment Request

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION ESTABLISHMENT REQUEST message identity | Message type | M | V | 1 |
| | Integrity protection maximum data rate | Integrity protection maximum data rate | M | V | 2 |
| | PDU session type | PDU session type | O | TV | 1 |
| | SSC mode | SSC mode | O | TV | 1 |
| | 5GSM capability | 5GSM capability | O | TLV | 3-15 |
| | Maximum number of supported packet filters | Maximum number of supported packet filters | O | TV | 3 |
| | Always-on PDU session requested | Always-on PDU session requested | O | TV | 1 |
| | SM PDU DN request container | SM PDU DN request container | O | TLV-E | 3-255 |
| | Extended protocol configuration options | Extended protocol configuration options | O | TLV-E | 4-65538 |
| | Additional access type/access type | | O | | |
| | Split request | | O | | |

According to various embodiments, when the PDU session establishment message is included in the UL NAS transport message, the PDU session establishment may omit the split request. This is because a multiple access is requested through the UL NAS transport message and thus another message (for example, PDU session establishment) is omitted. When not only the split request but also the additional access type/access type is indicated through the UL NAS transport message, the additional access type/access type may also be omitted. In other words, according to an embodiment, the presence or absence of the multiple access PDU session request of the PDU session may be notified by the PDU session establishment as shown in table 3, or may be notified by another message (for example, the UL NAS transport) according to another embodiment, or may be notified by both, that is, the UL NAS transport and the PDU session establishment message.

According to various embodiments, a PDU session modification request message may be used to split the PDU session. When the PDU session modification request message is used to split the PDU session as described above, it may be informed through the additional access information element that establishment is requested for another access to split the existing PDU session. In addition, the network may be informed through the split request information element that splitting of the PDU session is requested. For example, the PDU session modification request message may be configured as shown in table 4 presented below:

TABLE 4

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION Split REQUEST message identity | Message type | M | V | 1 |
| | 5GSM capability | 5GSM capability | O | TLV | 3-15 |
| | 5GSM cause | 5GSM cause | O | TV | 2 |
| | Maximum number of supported packet filters | Maximum number of supported packet filters | O | TV | 3 |
| | Always-on PDU session requested | Always-on PDU session requested | O | TV | 1 |
| | Integrity protection maximum data rate | Integrity protection maximum data rate | O | TV | 3 |
| | Requested QoS rules | QoS rules | O | TLV-E | 7-65538 |
| | Requested QoS flow descriptions | QoS flow descriptions | O | TLV-E | 5-65538 |
| | Mapped EPS bearer contexts | Mapped EPS bearer contexts | O | TLV-E | 7-65538 |
| | Extended protocol configuration options | Extended protocol configuration options | O | TLV-E | 4-65538 |
| | Additional Access type/access type | | O | | |
| | Split request | | O | | |

According to an embodiment, the Request type information element may be coded as shown in the table presented below. According to an embodiment, the request type vale in Table 5 may be interpreted as shown in the table presented below. For example, when the Request type information element is coded to '110' (that is, when each bit indicates 110), the Request type information element may be interpreted as split request, Multiple PDU session request, Access Traffic Steering, Switching, Splitting request/supported.

TABLE 5 request type information element

| 8 | 7 | 6 | 5 | 4 | 3 | 2 | 1 | |
|---|---|---|---|---|---|---|---|---|
| Request type IEI | | | | 0 spare | Request type value | | | octet 1 |

Request Type Information Element

TABLE 6

Request type value

Request type value (octet 1, bit 1 to bit 4)
Bits
| 3 | 2 | 1 | |
|---|---|---|---|
| 0 | 0 | 1 | initial request |
| 0 | 1 | 0 | existing PDU session |
| 0 | 1 | 1 | initial emergency request |
| 1 | 0 | 0 | existing emergency PDU session |
| 1 | 0 | 1 | modification request |
| 1 | 1 | 0 | Split request, Multiple PDU session Request |
| 1 | 1 | 1 | reserved |

All other values are unused and shall be interpreted as "initial request", if received by the network.

According to an embodiment, the split request information element may be coded as shown in the table presented below:

TABLE 7 split request information element

| 8 | 7 | 6 | 5 | 432 | 1 | |
|---|---|---|---|---|---|---|
| Split Request IEI | | | | 0 spare | Split request value | octet 1 |

Request Type Information Element

TABLE 8 split request value

Table 8 split Request value
Split Request type value (octet 1, bit 1)
Bits
| | | |
|---|---|---|
| 0 | | Split not requested |
| 1 | | Split requested |

At step 207, the SMF may transmit a PDU session establishment accept message to the UE via the AMF. The PDU session establishment accept message that the SMF transmits to the UE may be transmitted via the AMF, but the AMF may interpret the message received from the SMF. The AMF may transmit the PDU session establishment accept message received from the SMF to the UE. The AMF may identify UE to receive the PDU session establishment accept message. The AMF may transmit the PDU session establishment accept message to the identified UE.

The PDU session establishment accept message according to various embodiments may be configured as shown in the table presented below:

TABLE 9

PDU session establishment accept

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION ESTABLISHMENT ACCEPT message identity | Message type | M | V | 1 |
| | Selected PDU session type | PDU session type | M | V | ½ |
| | Selected SSC mode | SSC mode | M | V | ½ |
| | Authorized QoS rules | QoS rules | M | LV-E | 7-65538 |
| | Session AMBR | Session-AMBR | M | LV | 7 |
| | 5GSM cause | 5GSM cause | O | TV | 2 |
| | PDU address | PDU address | O | TLV | 7, 11 or 15 |
| | RQ timer value | GPRS timer | O | TV | 2 |
| | S-NSSAI | S-NSSAI | O | TLV | 3-10 |
| | Always-on PDU session indication | Always-on PDU session indication | O | TV | 1 |
| | Mapped EPS bearer contexts | Mapped EPS bearer contexts | O | TLV-E | 7-65538 |
| | EAP message | EAP message | O | TLV-E | 7-1503 |

TABLE 9-continued

PDU session establishment accept

| IEI | Information Element | Type/Reference | Presence | Format | Length |
|---|---|---|---|---|---|
| | Authorized QoS flow descriptions | QoS flow descriptions | O | TLV-E | 5-65538 |
| | Extended protocol configuration options | Extended protocol configuration options | O | TLV-E | 4-65538 |
| | DNN | DNN | O | TLV-E | 3-102 |
| | Access type | | O | | |

In an embodiment, a PDU session split command may be transmitted from the SMF to the UE. The PDU session split command may be configured as shown in table 10.

TABLE 10

PDU session split command

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION split COMMAND message identity | Message type | M | V | 1 |
| | 5GSM cause | 5GSM cause | O | TV | 2 |
| | Session AMBR | Session-AMBR | O | TLV | 8 |
| | RQ timer value | GPRS timer | O | TV | 2 |
| | Always-on PDU session indication | Always-on PDU session indication | O | TV | 1 |
| | Authorized QoS rules | QoS rules | O | TLV-E | 7-65538 |
| | Mapped EPS bearer contexts | Mapped EPS bearer contexts | O | TLV-E | 7-65538 |
| | Authorized QoS flow descriptions | QoS flow descriptions | O | TLV-E | 6-65538 |
| | Extended protocol configuration options | Extended protocol configuration options | O | TLV-E | 4-65538 |
| | Access type | | O | | |

In an embodiment, a PDU session modification command may be transmitted from the SMF to the UE. The PDU session modification command may be configured as shown in table 11 presented below:

TABLE 11

PDU session modification command

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION MODIFICATION COMMAND message identity | Message type | M | V | 1 |
| | 5GSM cause | 5GSM cause | O | TV | 2 |
| | Session AMBR | Session-AMBR | O | TLV | 8 |
| | RQ timer value | GPRS timer | O | TV | 2 |
| | Always-on PDU session indication | Always-on PDU session indication | O | TV | 1 |
| | Authorized QoS rules | QoS rules | O | TLV-E | 7-65538 |
| | Mapped EPS bearer contexts | Mapped EPS bearer contexts | O | TLV-E | 7-65538 |
| | Authorized QoS flow descriptions | QoS flow descriptions | O | TLV-E | 6-65538 |
| | Extended protocol configuration options | Extended protocol configuration options | O | TLV-E | 4-65538 |
| | Access type | | O | | |

According to various embodiments, to indicate whether to split a corresponding PDU session, an information element (IE) may be used. For example, as shown in the following tables, an information element (IE) informing splitting of the PDU session may be used.

TABLE 12

PDU session split information element

| 8 | 7 | 6 | 5 | 4 | 3 | 2 | 1 | |
|---|---|---|---|---|---|---|---|---|
| PDU session Split IEI | | | | | | | | octet 1 |
| Length of PDU session split | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | octet 5*-34* |
| | | | | Spare | | | | |

The information element identifier (IEI) may indicate that a corresponding IE is an IE for PDU session split (session Split EIE) through octet 1. The length may indicate a length of an IE for PDU session split through octet 2. Detailed information regarding session split with respect to a PDU session corresponding to a corresponding PDU session identity may be indicated by using a PDU session Identity (PSI). For example, the PSI may be interpreted as shown in the following table:

TABLE 13

PDU session split value interpretation

PSI(x) shall be coded as follows:
PSI(0):
Bit 1 of octet 3 is spare and shall be coded as zero.
PSI(1)-PSI(15):
0    indicates that the 5GSM state of the corresponding PDU session is PDU SESSION SPLIT
1    indicates that the 5GSM state of the corresponding PDU session is not PDU SESSION SPLIT
All bits in octet 5 to 34 are spare and shall be coded as zero, if the respective octet is included in the information element.

PSI (i) (i is 1 to 15) may indicate a state of 5G system session management in PDU session i.

According to various embodiments, an information element (IE) may be used to indicate an access of a PDU session. For example, as shown in the following table, an information element (IE) informing an access type, an additional access type may be used.

TABLE 14

Access Type

| 8 | 7 | 6 | 5 | 4 | 3 | 2 | 1 | |
|---|---|---|---|---|---|---|---|---|
| Access type IEI | | | | 0 spare | | Access type | | octet 1 |

Access Type Information Element

TABLE 15

Access type value

| Access type value (octet 1, bit 1 to bit 2) Bits | | |
|---|---|---|
| 2 | 1 | |
| 0 | 1 | 3 GPP access |
| 1 | 0 | Non-3 GPP access |

All other values are reserved

Access type or additional access type may be expressed by 1 bit as shown in the following:

TABLE 16

Access type

| 8 | 7 | 6 | 5 | 432 | 1 | |
|---|---|---|---|---|---|---|
| Access type IEI | | | | 0 spare | Access Type | octet 1 |

Access Type Information Element

TABLE 16-1

Access type value

| Access type value (octet 1, bit 1) Bits | |
|---|---|
| 1 | |
| 1 | 3GPP access |
| 0 | Non-3GPP access |

According to various embodiments, the UE and the SMF may share information regarding a session. The UE and the SMF may share information on a session that is activated.

According to various embodiments, the information on the session may be configured in the form of a bit map. The bit map may display a session that is activated by the UE and the SMF. According to an embodiment, the bit map may indicate that a corresponding PDU session among the PDU sessions is activated, with a possible value.

According to various embodiments, the information on the session may include information on what PDU session is activated on what access. The information on the session may indicate whether each PDU session is activated through a bitmap. In addition, an access to each PDU session may be notified through indication information such as an access type. For example, when the access type is set to 1, the indication information may indicate that the PDU session corresponds to the 3GPP access, and, when the access type is set to 0, the indication information may indicate that the PDU session corresponds to the non-3GPP access. In another example, when the access type is set to 0, the indication information may indicate that the PDU session corresponds to the non-3GPP, and, when the access type is set to 1, the indication information may indicate that the PDU session corresponds to the 3GPP access. It may be informed through the access type that the corresponding PDU session is activated.

According to various embodiments, since the access type indicates that the corresponding PDU session is activated with respect to the corresponding access type, a method of processing in the same information element (IE) may be possible. That is, regarding what PDU session is activated on what access, a part related to the PDU session may be expressed in the form of a bit map, and a part related to the corresponding access may inform of an access type. For example, three octets of the IE may be used. Two octets may display whether the PDU session is activated, and one octet may indicate an access type. For example, when the access type is set to 1, one octet may indicate the 3GPP access, and, when the access type is set to 0, one octet may indicate the non-3GPP access. In another example, when the access type is set to 0, one octet may indicate the 3GPP access, and, when the access type is set to 1, one octet may indicate the non-3GPP access.

In a method of generating a new PDU session according to various embodiments, the same PDU session ID as the existing PDU session may be allocated to the new PDU session. According to an embodiment, a PDU session newly generated on a new access may be generated by being copied identically to a PDU session existing on another access before being split. For example, a PDU session having PDU session ID #1 on the 3GPP access is assumed. The PDU session may be split, and PDU session ID #1 may be newly generated on the non-3GPP access. Traffic may be split on the newly generated PDU session.

FIG. 2 illustrates that the registration procedure between the UE and the AMF, that is, steps 201 and 203, are performed before the PDU session establishment request message and the PDU session accept message are transmitted and received, but in some embodiments, the registration procedure may be omitted. For example, when the PDU session modification message is transmitted to split the PDU session, procedures at steps 201 and 203 may be omitted. That is, embodiments of the disclosure are not limited by the operations illustrated in FIG. 2.

Even when the UL NAS transport message including the PDU session establishment request message is transmitted, the PDU session accept message may not be received in a specific situation (for example, a situation where the SMF does not support the corresponding access type). Therefore, the operations illustrated in FIG. 2 should not be interpreted as limiting embodiments. For example, step 207 may also be omitted.

(Method 2)

Figure 3:
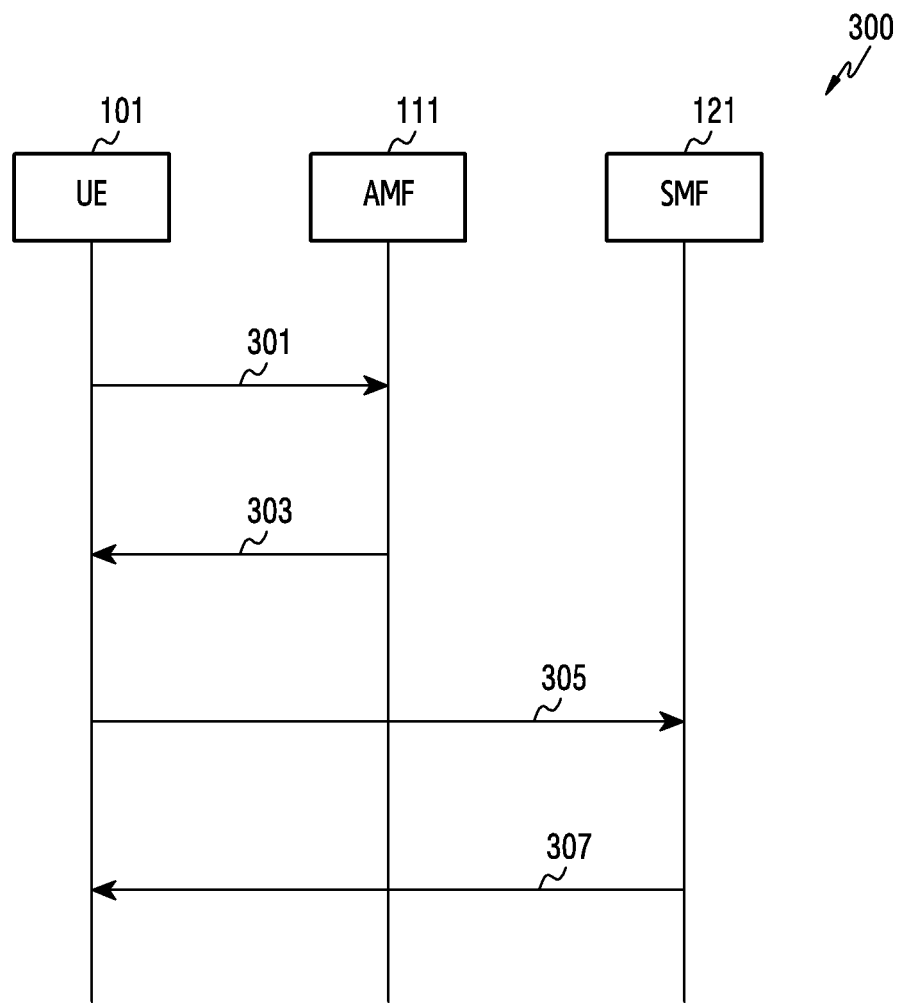
FIG. 3 is a view illustrating another example of NAS signaling for session management according to various embodiments of the disclosure.

FIG. 3 illustrates another example 300 of NAS signaling for session management according to various embodiments of the disclosure. Through FIG. 3, embodiments regarding a communication procedure, method through splitting of a session, session management, processing through an NAS protocol in a 5G network environment will be described. The session may include a protocol data unit (PDU) session. The PDU session refers to a connection or association between UE and a data network which provide a service by exchanging PDUs. Data traffic may be transmitted through the PDU session. The NAS protocol may include signaling between UE and an AMF or signaling between UE and an SMF. The UE exemplifies the UE 101 of FIG. 1. The AMF exemplifies the AMF 111 of FIG. 1. The SMF exemplifies the SMF 121 of FIG. 1.

Referring to FIG. 3, at step 301, the UE may transmit a registration request message to the AMF. The AMF may receive the registration request message from the UE.

At step 303, the AMF may transmit a registration response message to the UE. The UE may receive the registration response message from the AMF.

At step 305, the UE may transmit a PDU session establishment request message to the SMF via the AMF. The PDU session establishment request message that the UE transmits to the SMF may be transmitted via the AMF, but the AMF may interpret the message received from the UE, that is, the PDU session establishment request message. The AMF may transmit the PDU session establishment request message received from the UE to the SMF. The AMF may identify the SMF which will receive the PDU session establishment request message. The AMF may transmit the PDU session establishment request message to the identified SMF.

According to various embodiments, a request type may be indicated as a split to split a session. For example, when a session exists on a certain access, but a new session is generated on another access and the request type is indicated as a split, the session may be split.

According to an embodiment, indication information of 1 bit may be considered as a method for indicating another access type. For example, the indication information may be used to discriminate between two accesses by allocating 1 to a 3GPP access and allocating 0 to a non-3GPP access. In addition, in another example, the indication information may be used to discriminate between the two accesses by allocating 0 to the 3GPP access and allocating 1 to the non-3GPP access.

The indication information may be used to split a session to another access, not an access currently communicating, and to notify this. For example, when communication is performed with the 3GPP access, the indication information may indicate to split the session to the non-3GPP access. In another example, when communication is performed with the non-3GPP access, the indication information may indicate to split the session to the 3GPP access.

According to another embodiment, a method for indicating a current access type to inform an access currently communicating may be considered. The indication information may include information for indicating an access currently communicating. For example, when the UE communicates on the 3GPP access at step 301, step 303, and additionally, communication is performed by generating a session on the non-3GPP access and splitting each session, the indication information may include information indicating the 3GPP access. In another example, a reversed case is possible. When the UE communicates on the non-3GPP access at step S301, step 303, and additionally, communication is performed by generating a session on the 3GPP access and splitting each session, the indication information may include information indicating the non-3GPP access.

Splitting a session according to various embodiments may differ from switching a session to another access when handover occurs during communication through a certain access or a wireless state is degraded and communication is not smoothly performed on the corresponding access. Hereinafter, specific examples of indication information for splitting a session will be described.

At step 307, the SMF may transmit a PDU session establishment accept message to the UE via the AMF. The PDU session establishment accept message that the SMF transmits to the UE may be transmitted via the AMF, but the AMF may interpret the message received from the SMF. The AMF may transmit the PDU session establishment accept message received from the SMF to the UE. The AMF may identify UE to receive the PDU session establishment accept message. The AMF may transmit the PDU session establishment accept message to the identified UE.

According to various embodiments, the UE and the SMF may share information regarding a session. The UE and the SMF may share information regarding a session that is activated.

According to various embodiments, the information on the session may be configured in the form of a bit map. The bit map may indicate a session that is activated by the UE and the SMF. According to an embodiment, the bit map may indicate that a corresponding PDU session among the PDU sessions is activated, with a possible value.

According to various embodiments, the information on the session may include information on what PDU session is activated on what access. The information on the session may indicate whether each PDU session is activated through a bitmap. In addition, an access to each PDU session may be notified through indication information such as an access type. For example, when the access type is set to 1, the indication information may indicate that the PDU session corresponds to the 3GPP access, and, when the access type is set to 0, the indication information may indicate that the PDU session corresponds to the non-3GPP access. In another example, when the access type is set to 0, the indication information may indicate that the PDU session corresponds to the non-3GPP, and, when the access type is set to 1, the indication information may indicate that the PDU session corresponds to the 3GPP access. It may be informed through the access type that the corresponding PDU session is activated.

According to various embodiments, since the access type indicates that the corresponding PDU session is activated with respect to the corresponding access type, a method of processing in the same information element (IE) may be possible. That is, regarding what PDU session is activated on what access, a part related to the PDU session may be expressed in the form of a bit map, and a part related to the corresponding access may inform of an access type. For example, three octets of the IE may be used. Two octets may display whether the PDU session is activated, and one octet may indicate an access type. For example, when the access type is set to 1, one octet may indicate the 3GPP access, and, when the access type is set to 0, one octet may indicate the non-3GPP access. In another example, when the access type is set to 0, one octet may indicate the 3GPP access, and, when the access type is set to 1, one octet may indicate the non-3GPP access.

In a method of generating a new PDU session according to various embodiments, a different PDU session ID from that of an existing PDU session may be allocated to the new PDU session. According to an embodiment, a PDU session newly generated on a new access may be allocated a different PDU session ID from that of a PDU session existing on another access before being split. In this case, information on mapping between the two PDU sessions may be defined, and a method for managing or processing this may be required.

According to various embodiments, the UE and the SMF may manage the information on mapping and may process this. For example, when the UE, SMF use PDU session #1 for the 3GPP access, and split the PDU session to PDU session #3 on the non-3GPP access and use the same, the terminal and the SMF should manage mapping information regarding a PDU session of PDU session #1 and a PDU session of PDU session #3. The mapping information may include association between the 'PDU session 1 3GPP access active: PDU session 3 non-3GPP active'.

According to various embodiments, the UL NAS transport may be used to split a PDU session. For example, the UL NAS transport may be configured as shown in table 17 presented below:

TABLE 17

UL NAS transport

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | 1/2 |
| | Spare half octet | Spare half octet | M | V | 1/2 |
| | UL NAS TRANSPORT message identity | Message type | M | V | 1 |
| | Payload container type | Payload container type | M | V | 1/2 |
| | Spare half octet | Spare half octet | M | V | 1/2 |
| | Payload container | Payload container | M | LV-E | 3-65537 |
| | PDU session ID | PDU session identity 2 | C | TV | 2 |
| | Old PDU session ID | PDU session identity 2 | O | TV | 2 |
| | Request type | Request type | O | TV | 1 |
| | S-NSSAI | S-NSSAI | O | TLV | 3-10 |
| | DNN | DNN | O | TLV | 3-102 |
| | Additional information | Additional information | O | TLV | 3-n |
| | additional access type | additional access type | O | TV | |
| | access type | access type | O | TV | |

According to various embodiments, when the UE transmits the above-described UL NAS transport message to the AMF, the UE may configure the request type as shown in table 22 presented below. The request type may indicate a PDU session split request or a multiple access PDU session request, Access Traffic Steering, Switching, Splitting request/supported. The UE may use the request type of the UL NAS transport message in order to indicate a request of a function of the PDU session split request or multiple access PDU session request, Access Traffic Steering, Switching, or Splitting request/supported.

In addition, according to an embodiment, the UL NAS transport message transmitted from the UE to the AMF may include a PDU session establishment message. For example, the UE may include the PDU session establishment message in the payload container of the UL NAS transport message, and may transmit the UL NAS transport message. The UE may transmit the request type of the UL NAS transport message as defined in table 22, while including the PDU session establishment message, transmitted from the UE to the SMF, in the UL NAS transport message and transmitting. That is, the UE may transmit the UL NAS transport message which includes the PDU session establishment message and the request type of which indicates the PDU session split request or multiple access PDU session request, Access Traffic Steering, Switching, Splitting request/supported. According to various embodiments, one request type value may indicate the above-described functions/requests as shown in table 22. According to an embodiment, some functions may be separated and indicated through a separate request type value. Specifically, the request type indicating a split request may refer to not only requesting the PDU session to be split, but also additionally requesting a PDU session function through multiple accesses (multiple access PDU session request) or requesting a function of adjusting (sharing, splitting, adjusting, balancing) access traffic.

The UL NAS transport message may be transmitted between the UE and the AMF. The message between the UE and the AMF, that is, the UL NAS transport message, may include the PDU session establishment message to be transmitted to the SMF. That is, the message between the UE and the AMF may be configured in the form of UL NAS transport ([PDU session establishment message], request type, PDU session ID (identity), additional access type/access type). The request type may indicate whether the corresponding PDU session establishment message is an initial request or a multiple PDU session request, split. In addition, a corresponding PDU session ID may indicate whether the PDU session requests a multiple access PDU session with respect to another access type by a split, multiple access PDU session request. In addition, by additionally including an additional access type/access type and transmitting, an access for making a multiple access PDU session may be informed in one embodiment (case 1), or a current access type may be indicated in another embodiment (case 2). In other words, an information element (IE) added to the UL NAS transport message may indicate a target access or may indicate a current access type. For example, as shown in table 1, the UL NAS transport message may include an additional access type IE or an access type IE. According to an embodiment, the additional access type, the access type may be configured as shown in tables 30, 31, 32, 32-1. Table 17 illustrates that the UL NAS transport message includes the additional access type IE and the access type IE, but the UL NAS transport message including only one of the two IEs, and indicating a type of the target access or a current access type may be understood as an embodiment of the disclosure. The IE included in the UL NAS transport may be expressed by additional access type/access type.

The PDU session ID included in the PDU session establishment message may indicate a PDU session ID that wants a multiple access PDU session. According to various embodiments, cases where the same PDU session ID as the PDU session ID included in the PDU session establishment message is transmitted may be configured as follows:

Case 1): When a PDU session transmitted in 3GPP is first established, the case of a multiple PDU session transmitted on the non-3GPP access implies that the same PDU session is transmitted. That is, when a PDU session related to 3GPP is first established, a PDU session ID included in a message for the multiple PDU session transmitted on the non-3GPP access may be identical to the PDU session ID of the 3GPP.

Case 2): In the other case, when a PDU session transmitted in non-3GPP is first established, the case of a multiple PDU session transmitted on the 3GPP access implies that the same PDU session is transmitted. That is, unlike in Case 1, when the PDU session related to non-3GPP is first established, a PDU session ID included in a message for the multiple PDU session transmitted on the 3GPP access may be identical to the PDU session ID of the non-3GPP.

In addition, this embodiment may be applied in Case 1) where the 3GPP and the non-3GPP use the same AMF, the same PLMN, and in Case 2) where the 3GPP and the non-3GPP use different AMFs, different PLMNs. That is, the UE may inform the AMF that the multiple PDU session is requested even when there is a PDU session, through the request type, regardless of whether the AMF, the PLMN are the same or different. When the AMF receives this request from the UE, the AMF may find an SMF capable of dealing with the corresponding PDU session regardless of whether the PLMN is different or is the same, and may perform mapping. That is, the AMF may identify an SMF capable of managing the corresponding PDU session, regardless of the PLMN of the message including the request, and may associate the UE and the SMF.

The SMF may be synchronized with the UE. The SMF may manage a PDU session ID which is managed as a multiple PDU session in the UE, as a multiple PDU session. In addition, since the AMF should select (or identify) an appropriate corresponding SMF, the AMF may manage information regarding the multiple PDU session ID. The AMF may select an appropriate SMF and may transmit the PDU session establishment message, and, with respect to a message transmitted from the SMF to the UE, may find UE which has requested, and may transmit the message. According to various embodiments, the AMF may identify an SMF capable of managing the multiple PDU session ID, and may transmit the PDU session establishment to the identified SMF. According to various embodiments, the AMF may identify UE that has transmitted a request, based on a message received from the SMF. The AMF may transmit the message received from the SMF to the identified UE.

The above-described UL NAS transport message may be transmitted from the UE to the AMF, and in this case, the request type may be requesting the PDU session to be split as shown in table 18. In this case, a message for requesting the PDU session split is a PDU session split message. The PDU session split message is a message that is transmitted from the UE to the SMF, and is a message that is transmitted from the UE to the SMF via the AMF. That is, the UE according to various embodiments may transmit the PDU session split message to the SMF. The SMF may receive the PDU session split message from the UE.

TABLE 18

PDU session split Request message

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION Split REQUEST message identity | Message type | M | V | 1 |
| | 5GSM capability | 5GSM capability | O | TLV | 3-15 |
| | 5GSM cause | 5GSM cause | O | TV | 2 |
| | Maximum number of supported packet filters | Maximum number of supported packet filters | O | TV | 3 |
| | Always-on PDU session requested | Always-on PDU session requested | O | TV | 1 |
| | Integrity protection maximum data rate | Integrity protection maximum data rate | O | TV | 3 |
| | Requested QoS rules | QoS rules | O | TLV-E | 7-65538 |
| | Requested QoS flow descriptions | QoS flow descriptions | O | TLV-E | 5-65538 |
| | Mapped EPS bearer contexts | Mapped EPS bearer contexts | O | TLV-E | 7-65538 |
| | Extended protocol configuration options | Extended protocol configuration options | O | TLV-E | 4-65538 |
| | Access type | | O | | |

A case where the PDU session split message described above is used may be a case where an existing PDU session already exists. That is, when there exists a PDU session, the UE may transmit a message for requesting a PDU session split to the SMF. Accordingly, a PDU session ID may indicate an identity of a PDU session which wants to be split.

The PDU session split message may include information indicating an access type. The information indicating the access type may be an information element (IE) that is used for indicating another access that wants to split the PDU session.

According to various embodiments, the PDU session establishment request message may be used to split the PDU session. For example, the PDU establishment request message may be configured as shown in table 19. When the PDU session establishment request message is used to split the PDU session, it may be informed through an additional access information element that establishment of the PDU session is not initially requested, and establishment is requested for another access to split the existing PDU session. That is, the PDU session establishment request message may additionally include information indicating addition of a PDU session according to a new access. In addition, according to an embodiment, the network may be informed through a split request information element that the request is made to split the PDU session.

TABLE 19

PDU session establishment Request

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION ESTABLISHMENT REQUEST message identity | Message type | M | V | 1 |
| | Integrity protection maximum data rate | Integrity protection maximum data rate | M | V | 2 |
| | PDU session type | PDU session type | O | TV | 1 |
| | SSC mode | SSC mode | O | TV | 1 |
| | 5GSM capability | 5GSM capability | O | TLV | 3-15 |
| | Maximum number of supported packet filters | Maximum number of supported packet filters | O | TV | 3 |
| | Always-on PDU session requested | Always-on PDU session requested | O | TV | 1 |
| | SM PDU DN request container | SM PDU DN request container | O | TLV-E | 3-255 |
| | Extended protocol configuration options | Extended protocol configuration options | O | TLV-E | 4-65538 |
| | Additional access type/access type | | | O | |
| | Split request | | | O | |

According to various embodiments, when the PDU session establishment message is included in the UL NAS transport message, the PDU session establishment may omit the split request. This is because a multiple access is requested through the UL NAS transport message and thus other message (for example, PDU session establishment) is omitted. When not only the split request but also the additional access type/access type is indicated through the UL NAS transport message, the additional access type/ access type may also be omitted. In other words, according to an embodiment, the presence or absence of the multiple access of the PDU session may be notified by the PDU session establishment as shown in table 3, or may be notified by another message (for example, the UL NAS transport) according to another embodiment.

According to various embodiments, a PDU session modification request message may be used to split the PDU session. When the PDU session modification request message is used to split the PDU session as described above, it may be informed through the additional access information element that establishment is requested for another access to split the existing PDU session. In addition, the network may be informed through the split request information element that splitting of the PDU session is requested. For example, the PDU session modification request message may be configured as shown in table 20 presented below:

TABLE 20

PDU session modification Request message

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION Split REQUEST message identity | Message type | M | V | 1 |
| | 5GSM capability | 5GSM capability | O | TLV | 3-15 |
| | 5GSM cause | 5GSM cause | O | TV | 2 |
| | Maximum number of supported packet filters | Maximum number of supported packet filters | O | TV | 3 |
| | Always-on PDU session requested | Always-on PDU session requested | O | TV | 1 |
| | Integrity protection maximum data rate | Integrity protection maximum data rate | O | TV | 3 |
| | Requested QoS rules | QoS rules | O | TLV-E | 7-65538 |
| | Requested QoS flow descriptions | QoS flow descriptions | O | TLV-E | 5-65538 |
| | Mapped EPS bearer contexts | Mapped EPS bearer contexts | O | TLV-E | 7-65538 |
| | Extended protocol configuration options | Extended protocol configuration options | O | TLV-E | 4-65538 |
| | Additional Access type/access type | | O | | |
| | Split request | | O | | |

According to an embodiment, the Request type information element may be coded as shown in the table presented below. According to an embodiment, the request type vale in Table 21 may be interpreted as in table 22 presented below. For example, when the Request type information element is coded to '110', the Request type information element may be interpreted as a split request. According to various embodiments, the split request coded to '110' may be interpreted as including a multiple PDU session request, access traffic steering, split, switching request, support.

TABLE 21 request type information element

| 8 | 7 | 6 | 5 | 4 | 3 | 2 | 1 |
|---|---|---|---|---|---|---|---|
| Request type IEI | | | | 0 spare | Request type value | | octet 1 |

Request Type Information Element

TABLE 22 request type value

Request type value (octet 1, bit 1 to bit 4)
Bits
| 3 | 2 | 1 | |
|---|---|---|---|
| 0 | 0 | 1 | initial request |
| 0 | 1 | 0 | existing PDU session |
| 0 | 1 | 1 | initial emergency request |
| 1 | 0 | 0 | existing emergency PDU session |
| 1 | 0 | 1 | modification request |
| 1 | 1 | 0 | Split request, Multiple PDU session Request |
| 1 | 1 | 1 | reserved |

All other values are unused and shall be interpreted as "initial request", if received by the network.

According to an embodiment, the split request information element may be coded as in the table presented below:

TABLE 23 split request information element

| 8 | 7 | 6 | 5 | 432 | 1 | |
|---|---|---|---|---|---|---|
| Split Request IEI | | | | 0 spare | Split request value | octet 1 |

Request Type Information Element

TABLE 24 split request value

Split Request type value (octet 1, bit 1)
Bits
| 0 | Split not requested |
|---|---|
| 1 | Split requested |

According to various embodiments, the PDU session establishment accept message at step 307 of FIG. 3 may be configured as shown in table 15 presented below:

TABLE 25

PDU session establishment accept

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION ESTABLISHMENT ACCEPT message identity | Message type | M | V | 1 |
| | Selected PDU session type | PDU session type | M | V | 1/2 |
| | Selected SSC mode | SSC mode | M | V | 1/2 |
| | Authorized QoS rules | QoS rules | M | LV-E | 7-65538 |
| | Session AMBR | Session-AMBR | M | LV | 7 |
| | 5GSM cause | 5GSM cause | O | TV | 2 |
| | PDU address | PDU address | O | TLV | 7, 11 or 15 |
| | RQ timer value | GPRS timer | O | TV | 2 |
| | S-NSSAI | S-NSSAI | O | TLV | 3-10 |
| | Always-on PDU session indication | Always-on PDU session indication | O | TV | 1 |

TABLE 25-continued

PDU session establishment accept

| IEI | Information Element | Type/Reference | Presence | Format | Length |
|---|---|---|---|---|---|
| | Mapped EPS bearer contexts | Mapped EPS bearer contexts | O | TLV-E | 7-65538 |
| | EAP message | EAP message | O | TLV-E | 7-1503 |
| | Authorized QoS flow descriptions | QoS flow descriptions | O | TLV-E | 5-65538 |
| | Extended protocol configuration options | Extended protocol configuration options | O | TLV-E | 4-65538 |
| | DNN | DNN | O | TLV-E | 3-102 |
| | Access type | | O | | |

In an embodiment, a PDU session split command may be transmitted from the SMF to the UE. The PDU session split command may be configured as shown in table 26.

TABLE 26

PDU session split command

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION split COMMAND message identity | Message type | M | V | 1 |
| | 5GSM cause | 5GSM cause | O | TV | 2 |
| | Session AMBR | Session-AMBR | O | TLV | 8 |
| | RQ timer value | GPRS timer | O | TV | 2 |
| | Always-on PDU session indication | Always-on PDU session indication | O | TV | 1 |
| | Authorized QoS rules | QoS rules | O | TLV-E | 7-65538 |
| | Mapped EPS bearer contexts | Mapped EPS bearer contexts | O | TLV-E | 7-65538 |
| | Authorized QoS flow descriptions | QoS flow descriptions | O | TLV-E | 6-65538 |
| | Extended protocol configuration options | Extended protocol configuration options | O | TLV-E | 4-65538 |
| | Access type | | O | | |

In an embodiment, a PDU session modification command may be transmitted from the SMF to the UE. The PDU session modification command may be configured as shown in table 27 presented below:

TABLE 27

PDU session modification command

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION MODIFICATION COMMAND message identity | Message type | M | V | 1 |
| | 5GSM cause | 5GSM cause | O | TV | 2 |
| | Session AMBR | Session-AMBR | O | TLV | 8 |

TABLE 27-continued

PDU session modification command

| IEI | Information Element | Type/Reference | Presence | Format | Length |
|---|---|---|---|---|---|
| | RQ timer value | GPRS timer | O | TV | 2 |
| | Always-on PDU session indication | Always-on PDU session indication | O | TV | 1 |
| | Authorized QoS rules | QoS rules | O | TLV-E | 7-65538 |
| | Mapped EPS bearer contexts | Mapped EPS bearer contexts | O | TLV-E | 7-65538 |
| | Authorized QoS flow descriptions | QoS flow descriptions | O | TLV-E | 6-65538 |
| | Extended protocol configuration options | Extended protocol configuration options | O | TLV-E | 4-65538 |
| | Access type | | O | | |

According to various embodiments, to indicate whether to split a corresponding PDU session, an information element (IE) may be used. For example, as shown in tables 28 and 29, an information element (IE) informing splitting of the PDU session may be used.

TABLE 28

PDU session split information element

| 8 | 7 | 6 | 5 | 4 | 3 | 2 | 1 | |
|---|---|---|---|---|---|---|---|---|
| PDU session Split IEI | | | | | | | | octet 1 |
| Length of PDU session split | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | octet 5*-34* |
| | | | Spare | | | | | |

The information element identifier (IEI) may indicate that a corresponding IE is an IE for PDU session split (session Split EIE) through octet 1. The length may indicate a length of an IE for PDU session split through octet 2. Detailed information regarding corresponding session split may be indicated by using a PDU session identity (PSI). For example, a PSI session split value may be interpreted as shown in table 29:

TABLE 29

PDU session split value interpretation

PSI(x) shall be coded as follows:
PSI(0):
Bit 1 of octet 3 is spare and shall be coded as zero.
PSI(1)-PSI(15):
0  indicates that the 5GSM state of the corresponding PDU session is PDU
SESSION SPLIT
1  indicates that the 5GSM state of the corresponding PDU session is not
PDU SESSION SPLIT
All bits in octet 5 to 34 are spare and shall be coded as zero, if the respective
octet is included in the information element.

According to various embodiments, an information element (IE) may be used to indicate an access of a PDU session. For example, as shown in table 30, an information element (IE) informing an access type may be used.

TABLE 30

Access Type

| 8 | 7 | 6 | 5 | 4 | 3 | 2 | 1 | |
|---|---|---|---|---|---|---|---|---|
| Access type IEI | | | | 0 spare | | Access type | | octet 1 |

Access Type Information Element

TABLE 31

Access type value interpretation

| Access type value (octet 1, bit 1 to bit 2) Bits | | |
|---|---|---|
| 2 | 1 | |
| 0 | 1 | 3GPP access |
| 1 | 0 | Non-3GPP access |

All other values are reserved

The access type or the additional access type may be expressed by 1 bit as follows:

TABLE 32-1

Access type value

| 8 | 7 | 6 | 5 | 432 | 1 | |
|---|---|---|---|---|---|---|
| Access type IEI | | | | 0 spare | Access Type | octet 1 |

Access Type Information Element

TABLE 32-1

Access type value

| Access type value (octet 1, bit 1) Bits | |
|---|---|
| 1 | |
| 1 | 3GPP access |
| 0 | Non-3GPP access |

FIG. 3 illustrates that the registration procedure between the UE and the AMF, that is, steps 301 and 303, are performed before the PDU session establishment request message and the PDU session accept message are transmitted and received, but in some embodiments, the registration procedure may be omitted. For example, when the PDU session modification message is transmitted to split the PDU session, procedures at steps 301 and 303 may be omitted. That is, embodiments of the disclosure are not limited by the operations illustrated in FIG. 3.

Even when the UL NAS transport message including the PDU session establishment request message is transmitted, the PDU session accept message may not be received in a specific situation (for example, a situation where the SMF does not support the corresponding access type). Therefore, the operations illustrated in FIG. 3 should not be interpreted as limiting embodiments. For example, step 307 may also be omitted.

Additionally, messages for splitting the PDU session are exemplified through tables 17 to 32-1. The disclosure defines mapping information between a new PDU session and an existing PDU session, such that the UE and the SMF can share a relationship between PDU sessions having different IDs. According to various embodiments, IEs additionally defining mapping relationship may be added to at least a part of tables 17 to 32-1.

Figure 4:
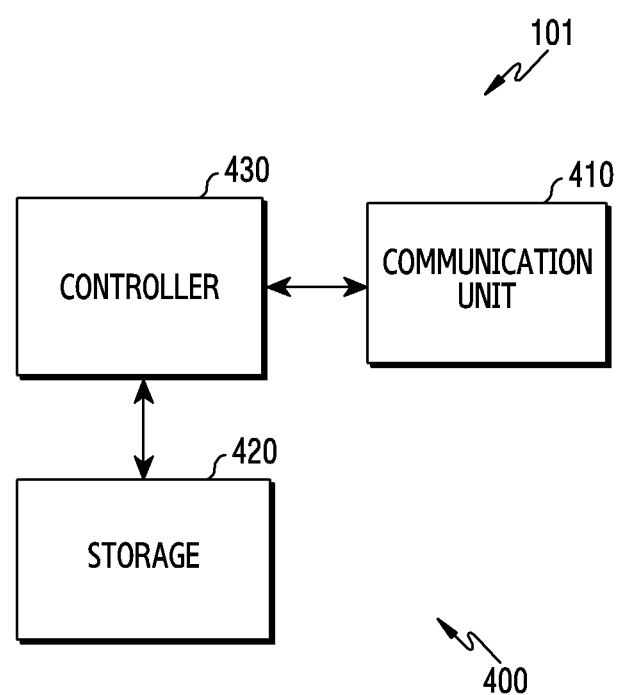
FIG. 4 is a view illustrating a functional configuration of user equipment (UE) according to various embodiments of the disclosure.

FIG. 4 illustrates a functional configuration 400 of a terminal (UE) according to various embodiments of the disclosure. The configuration illustrated in FIG. 4 may be understood as the UE 101 of FIG. 1. The term "unit" or terms ending with suffixes "-er," and "-or" used in the following description refer to a unit processing at least one function or operation, and may be implemented by hardware, software, or a combination of hardware and software.

Referring to FIG. 4, the UE may include a communication unit 410, a storage 420, and a controller 430.

The communication unit 410 may perform functions for transmitting and receiving signals via a wireless channel. For example, the communication unit 410 may perform a function of converting between a baseband signal and a bit stream according to a physical layer standard of a system. For example, when transmitting data, the communication unit 410 may generate complex symbols by encoding and modulating a transmission bit stream. In addition, when receiving data, the communication unit 410 may restore a reception bit stream by demodulating and decoding a baseband signal. In addition, the communication unit 410 may up-convert a baseband signal into a radio frequency (RF) band signal, and then may transmit the signal via an antenna, and may down-convert an RF band signal received via an antenna into a baseband signal. For example, the communication unit 410 may include a transmission filter, a reception filter, an amplifier, a mixer, an oscillator, a digital-to-analogue converter (DAC), an analogue-to-digital converter (ADC).

In addition, the communication unit 410 may include a plurality of transmission and reception paths. Furthermore, the communication unit 410 may include at least one antenna array including a plurality of antenna elements. In the hardware aspect, the communication unit 410 may be configured by a digital circuit and an analog circuit (for example, a radio frequency integrated circuit (RFIC)). Herein, the digital circuit and the analogue circuit may be implemented as a single package. In addition, the communication unit 410 may include a plurality of RF chains. Furthermore, the communication unit 410 may perform beamforming.

In addition, the communication unit 410 may include different communication modules to process signals of different frequency bands. Furthermore, the communication unit 410 may include a plurality of communication modules to support a plurality of different wireless access technologies. For example, the different wireless access technologies may include Bluetooth low energy (BLE), wireless fidelity (Wi-Fi), Wi-Fi Gigabyte (WiGig), a cellular network (for example, long term evolution (LTE)). In addition, the different frequency bands may include a super high frequency (SHF) (for example, 2.5 GHz, 5 GHz, or 6 GHz) band, or a millimeter (mm) wave (for example, 28 GHz, 60 GHz) band.

The communication unit 410 may transmit and receive signals as described above. Accordingly, an entirety or a portion of the communication unit 410 may be referred to as a "transmitter," "receiver," or "transceiver." In addition, in the following description, transmitting and receiving via a wireless channel may be used as a meaning including processing by the communication unit 410 as described above.

The storage 420 may store data such as a basic program for the operation of the UE, an application program, configuration information, etc. The storage 420 may be configured by a volatile memory, a nonvolatile memory, or a combination of a volatile memory and a nonvolatile memory. In addition, the storage 420 may provide stored data according to a request of the controller 430.

The controller 430 controls overall operations of the UE. For example, the controller 430 may transmit and receive signals through the communication unit 410. In addition, the controller 430 may record, read out data on, from the storage 420. In addition, the controller 430 may perform functions of a protocol stack required by communication standards. According to another implementation example, the protocol stack may be included in the communication unit 410. To achieve this, the controller 430 may include at least one processor.

According to various embodiments, the controller 430 may control the UE to perform operations according to various embodiments of the disclosure. The UE may perform NAS signaling with an AMF or SMF, which is a network entity. For example, the UE may transmit a registration request message to the AMF. In addition, for example, the UE may receive a registration request response message from the AMF. In addition, for example, the UE may transmit a PDU session establishment request message to the SFM. In addition, the UE may receive a PDU session establishment accept message from the SMF.

According to various embodiments, the UE may transmit information for requesting a split to the SMF in order to split a PDU session. The PDU session establishment request message may include information regarding the above-described request. In addition, the PDU session establishment request message may include an ID of a PDU session for splitting. The PDU session establishment accept message may include a response to the request. In addition, the UE may share an access type of a session to be generated through PDU session splitting, with the SMF. The PDU session establishment request message may include information on the access type for the SMF. The PDU session establishment accept message may include the information on the access type.

According to various embodiments, a new PDU session may be generated by splitting of the PDU session. The ID of the PDU session for splitting may be included in at least one of the PDU session establishment request message and the PDU session establishment accept message. According to an embodiment, an ID of the newly generated PDU session may be identical to the ID of the existing PDU session. According to another embodiment, the ID of the newly generated PDU session may be different from the ID of the existing PDU session. In this case, mapping information defining a relationship between the two PDU sessions due to splitting of the PDU session may be included in at least one of the PDU session establishment request message and the PDU session establishment accept message.

Figure 5:
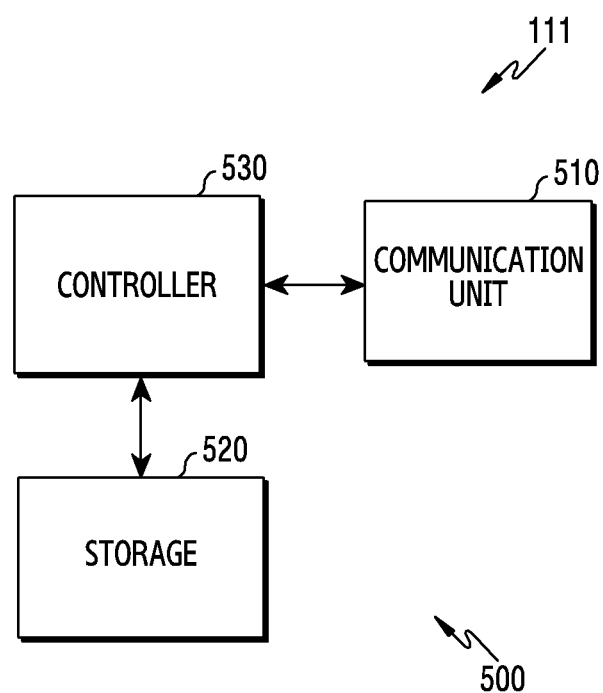
FIG. 5 is a view illustrating a functional configuration of an access and mobility management function (AMF) according to various embodiments of the disclosure.

FIG. 5 illustrates a functional configuration 500 of an AMF according to various embodiments of the disclosure. The configuration illustrated in FIG. 5 may be understood as the AMF 111 of FIG. 1. The term "unit" or terms ending with suffixes "-er," and "-or" used in the following description refer to a unit processing at least one function or operation, and may be implemented by hardware, software, or a combination of hardware and software.

Referring to FIG. 5, the AMF may include a communication unit 510, a storage 520, and a controller 530.

The communication unit 510 may perform functions for transmitting and receiving signals in a wired communication environment. The communication unit 510 may include a wired interface for controlling direct connection between devices through a transmission medium (for example, a copper line, an optical fiber). For example, the communication unit 510 may transmit an electric signal to another device through a copper line, or may perform conversion between an electric signal and an optical signal. The communication unit 510 may transmit and receive signals between network entities forming a core network according to wired communication interface standards.

The communication unit 510 may perform functions for transmitting and receiving signals through a wireless channel. For example, the communication unit 510 may perform a function of converting between a baseband signal and a bit stream according to a physical layer standard of a system. For example, when transmitting data, the communication unit 510 may generate complex symbols by encoding and modulating a transmission bit stream. In addition, when receiving data, the communication unit 510 may restore a reception bit stream by demodulating and decoding a baseband signal. In addition, the communication unit 510 may up-convert a baseband signal into an RF band signal, and then may transmit the signal via an antenna, and may down-convert an RF band signal received via an antenna into a baseband signal. For example, the communication unit 510 may include a transmission filter, a reception filter, an amplifier, a mixer, an oscillator, a DAC, an ADC.

The communication unit 510 may transmit and receive signals as described above. Accordingly, an entirety or a portion of the communication unit 510 may be referred to as a "transmitter," "receiver," or "transceiver." In addition, in the following description, transmitting and receiving via a wireless channel may be used as a meaning including processing by the communication unit 510 as described above.

The storage 520 may store data such as a basic program for the operation of the network entity, an application program, configuration information, etc. The storage 520 may be configured by a volatile memory, a nonvolatile memory, or a combination of a volatile memory and a nonvolatile memory. In addition, the storage 520 may provide stored data according to a request of the controller 530.

The controller 530 controls overall operations of the AMF. For example, the controller 530 may transmit and receive signals through the communication unit 510. In addition, the controller 530 may record, read out data on, from the storage 520. In addition, the controller 530 may perform functions of a protocol stack required by communication standards. According to another implementation example, the protocol stack may be included in the communication unit 510. To achieve this, the controller 530 may include at least one processor.

According to various embodiments, the controller 530 may control the AMF to perform operations according to various embodiments of the disclosure. For example, the controller 530 may receive a registration request message transmitted from the UE via an eNB or gNB. In addition, for example, the controller 530 may transmit a registration response message to the UE through the eNB or gNB. In addition, for example, the controller 530 may transmit, to an SMF, a PDU session establishment request message received from the UE via the eNB or gNB. In addition, for example, the controller 530 may transmit, to the UE via the eNB or gNB, a PDU session establishment accept message received from the SMF as it is. Signaling between the UE and the AMF may be NAS signaling.

Figure 6:
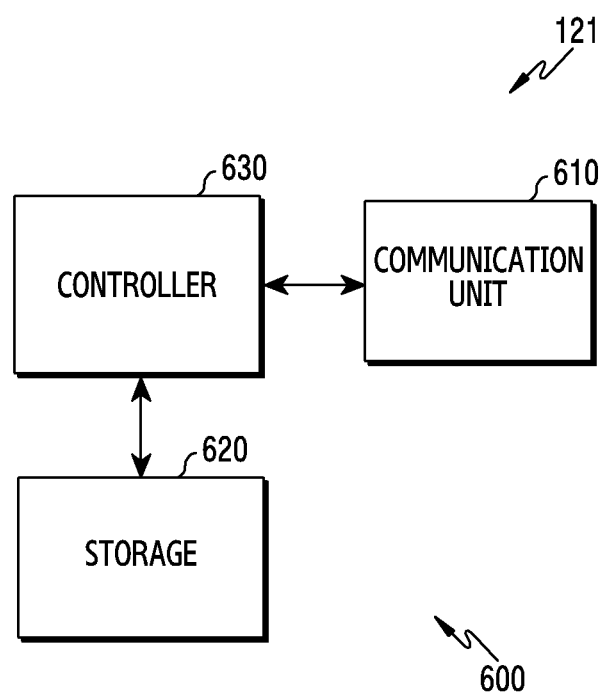
FIG. 6 is a view illustrating a functional configuration of a session management function (SMF) according to various embodiments of the disclosure.

FIG. 6 illustrates a functional configuration 600 of an SFM according to various embodiments of the disclosure. The configuration illustrated in FIG. 6 may be understood as the SMF 121 of FIG. 1. The term "unit" or terms ending with suffixes "-er," and "-or" used in the following description refer to a unit processing at least one function or operation, and may be implemented by hardware, software, or a combination of hardware and software.

Referring to FIG. 6, the SMF may include a communication unit 610, a storage 620, and a controller 630.

The communication unit 610 may perform functions for transmitting and receiving signals in a wired communication environment. The communication unit 610 may include a wired interface for controlling direct connection between devices through a transmission medium (for example, a copper line, an optical fiber). For example, the communication unit 610 may transmit an electric signal to another device through a copper line, or may perform conversion between an electric signal and an optical signal. The communication unit 610 may transmit and receive signals between network entities forming a core network according to wired communication interface standards.

The communication unit 610 may perform functions for transmitting and receiving signals through a wireless channel. For example, the communication unit 610 may perform a function of converting between a baseband signal and a bit stream according to a physical layer standard of a system. For example, when transmitting data, the communication unit 610 may generate complex symbols by encoding and modulating a transmission bit stream. In addition, when receiving data, the communication unit 610 may restore a reception bit stream by demodulating and decoding a baseband signal. In addition, the communication unit 610 may up-convert a baseband signal into an RF band signal, and then may transmit the signal via an antenna, and may down-convert an RF band signal received via an antenna into a baseband signal. For example, the communication unit 610 may include a transmission filter, a reception filter, an amplifier, a mixer, an oscillator, a DAC, an ADC.

The communication unit 610 may transmit and receive signals as described above. Accordingly, an entirety or a portion of the communication unit 610 may be referred to as a "transmitter," "receiver," or "transceiver." In addition, in the following description, transmitting and receiving via a wireless channel may be used as a meaning including processing by the communication unit 610 as described above.

The storage 620 may store data such as a basic program for the operation of the network entity, an application program, configuration information, etc. The storage 620 may be configured by a volatile memory, a nonvolatile memory, or a combination of a volatile memory and a nonvolatile memory. In addition, the storage 620 may provide stored data according to a request of the controller 630.

The controller 630 controls overall operations of the SMF. For example, the controller 630 may transmit and receive signals through the communication unit 610. In addition, the controller 630 may record, read out data on, from the storage 620. In addition, the controller 630 may perform functions of a protocol stack required by communication standards. According to another implementation example, the protocol stack may be included in the communication unit 610. To achieve this, the controller 630 may include at least one processor.

According to various embodiments, the controller 630 may control the SMF to perform operations according to various embodiments of the disclosure. The SMF may perform NAS signaling with the UE. For example, the SMF may receive a PDU session establishment request message from the UE. In addition, the SMF may transmit a PDU session establishment accept message to the UE.

According to various embodiments, the SMF may receive information for requesting splitting of a PDU session from the UE. The PDU session establishment request message may include information regarding the above-described request. In addition, the PDU session establishment request message may include an ID of a PDU session to be split. The PDU session establishment accept message may include a response to the request. In addition, the SMF may share an access type of a section to be generated through PDU session splitting with the UE. The PDU session establishment request message may include information regarding the access type. The PDU session establishment accept message may include information regarding the access type.

According to various embodiments, a new PDU session may be generated by splitting of the PDU session. The ID of the PDU session for splitting may be included in at least one of the PDU session establishment request message and the PDU session establishment accept message. According to an embodiment, an ID of the newly generated PDU session may be identical to the ID of the existing PDU session. According to another embodiment, the ID of the newly generated PDU session may be different from the ID of the existing PDU session. In this case, mapping information defining a relationship between the two PDU sessions due to splitting of the PDU session may be included in at least one of the PDU session establishment request message and the PDU session establishment accept message.

The disclosure suggests a method for transmitting data traffic through an existing PDU session and an added PDU session through splitting of the PDU session. The data traffic is shared through the added PDU session, so that overload in the existing PDU session can be prevented and efficient data communication can be provided. Although it is illustrated in the disclosure that a PDU session of the non-3GPP access is added in a PDU session of the 3GPP access, or conversely, the PDU session of the 3GPP access is added in the PDU session of the non 3GPP access, various embodiments of the disclosure are not limited thereto. The feature that a PDU session of the 3GPP access is additionally added in a PDU session of the 3GPP access, and a load of the existing PDU session is shared may be understood as an embodiment of the disclosure.

According to various embodiments, an operating method of a terminal (user equipment (UE)) in a wireless communication system may include a process of performing data communication based on a first protocol data unit (PDU) session on a first access network, a process of transmitting a PDU session establishment request message for generating a second PDU session on a second access network to a network entity of a session management function (SMF), a process of receiving a PDU session establishment accept message from the network entity of the SMF, and a process of performing data communication based on the first PDU session and the second PDU session, based on the PDU session establishment accept message, and the first access network may include one of a $3^{rd}$ generation partnership project (3GPP) access and a non-3GPP access, and the second access network may include the other one of the 3GPP access and the non-3GPP access.

According to various embodiments, the PDU session establishment request message may include information for requesting a session split from the first PDU session, the PDU session establishment accept message may include information indicating an access type of the second PDU session, the access type may indicate whether the second PDU session is the 3GPP access or the non-3GPP access, and the second PDU session may be generated based on the request.

According to various embodiments, an identifier (ID) of the second PDU session may be identical to an ID of the first PDU session.

According to various embodiments, a second identifier (ID) of the second PDU session may be generated to be different from a first ID of the first PDU session, and the PDU session establishment request message or the PDU session establishment accept message may include mapping information including a mapping relationship between the first ID and the second ID.

According to various embodiments, the PDU session establishment request message and the PDU session establishment request message may be transmitted by using non-access stratum (NAS) signaling, and the PDU session establishment request message may be transmitted via an evolved NodeB (eNB) or a 5th generation Node B (gNB) of the 3GPP access when the first PDU session is the 3GPP access, and the PDU session establishment request message may be transmitted through a non-3GPP inter-working function (N3IWF) when the first PDU session is the non-3GPP access.

According to various embodiments, an operating method of an entity providing a session management function (SMF) in a wireless communication system may include a process of performing data communication with a terminal (user equipment (UE)), based on a first protocol data unit (PDU) session on a first access network, a process of receiving a PDU session establishment request message for generating a second PDU session on a second access network from the terminal, a process of transmitting a PDU session establishment accept message from the network entity of the SMF to the terminal, and a process of performing data communication with the terminal, based on the first PDU session and the second PDU session, based on the PDU session establishment accept message, and the first access network may include one of a 3rd generation partnership project (3GPP) access and a non-3GPP access, and the second access network may include the other one of the 3GPP access and the non-3GPP access.

According to various embodiments, the PDU session establishment request message may include information for requesting a session split from the first PDU session, the PDU session establishment accept message may include information indicating an access type of the second PDU session, the access type may indicate whether the second PDU session is the 3GPP access or the non-3GPP access, and the second PDU session may be generated based on the request.

According to various embodiments, an identifier (ID) of the second PDU session may be identical to an ID of the first PDU session.

According to various embodiments, a second identifier (ID) of the second PDU session may be generated to be different from a first ID of the first PDU session, and the PDU session establishment request message or the PDU session establishment accept message may include mapping information including a mapping relationship between the first ID and the second ID.

According to various embodiments, the PDU session establishment request message and the PDU session establishment request message may be transmitted by using non-access stratum (NAS) signaling, and the PDU session establishment request message may be transmitted via an evolved NodeB (eNB) or a 5th generation Node B (gNB) of the 3GPP access when the first PDU session is the 3GPP access, and the PDU session establishment request message may be transmitted via a non-3GPP inter-working function (N3IWF) when the first PDU session is the non-3GPP access.

According to various embodiment, an apparatus of a terminal (user equipment (UE)) in a wireless communication system may include at least one transceiver and at least one processor operatively coupled with the at least one transceiver, and the at least one processor may be configured to perform data communication based on a first protocol data unit (PDU) session on a first access network, to transmit a PDU session establishment request message for generating a second PDU session on a second access network to a network entity of a session management function (SMF), to receive a PDU session establishment accept message from the network entity of the SMF, and to perform data communication based on the first PDU session and the second PDU session, based on the PDU session establishment accept message, and the first access network may include one of a $3^{rd}$ generation partnership project (3GPP) access and a non-3GPP access, and the second access network may include the other one of the 3GPP access and the non-3GPP access.

According to various embodiments, the PDU session establishment request message may include information for requesting a session split from the first PDU session, the PDU session establishment accept message may include information indicating an access type of the second PDU session, the access type may indicate whether the second PDU session is the 3GPP access or the non-3GPP access, and the second PDU session may be generated based on the request.

According to various embodiments, an identifier (ID) of the second PDU session may be identical to an ID of the first PDU session.

According to various embodiments, a second identifier (ID) of the second PDU session may be generated to be different from a first ID of the first PDU session, and the PDU session establishment request message or the PDU session establishment accept message may include mapping information including a mapping relationship between the first ID and the second ID.

According to various embodiments, the PDU session establishment request message and the PDU session establishment request message may be transmitted by using non-access stratum (NAS) signaling, and the PDU session establishment request message may be transmitted via an evolved NodeB (eNB) or a 5th generation Node B (gNB) of the 3GPP access when the first PDU session is the 3GPP access, and the PDU session establishment request message may be transmitted through a non-3GPP inter-working function (N3IWF) when the first PDU session is the non-3GPP access.

According to various embodiments, an apparatus of an entity providing a session management function (SMF) in a wireless communication system may include at least one transceiver and at least one processor operatively coupled with the at least one transceiver, and the at least one processor may be configured to perform data communication with a terminal (user equipment (UE)), based on a first protocol data unit (PDU) session on a first access network, to receive a PDU session establishment request message for generating a second PDU session on a second access network from the terminal, to transmit a PDU session establishment accept message from the network entity of the SMF to the terminal, and to perform data communication with the terminal, based on the first PDU session and the second PDU session, based on the PDU session establishment accept message, and the first access network may include one of a 3$^{rd}$ generation partnership project (3GPP) access and a non-3GPP access, and the second access network may include the other one of the 3GPP access and the non-3GPP access.

According to various embodiments, the PDU session establishment request message may include information for requesting a session split from the first PDU session, the PDU session establishment accept message may include information indicating an access type of the second PDU session, the access type may indicate whether the second PDU session is the 3GPP access or the non-3GPP access, and the second PDU session may be generated based on the request.

According to various embodiments, an identifier (ID) of the second PDU session may be identical to an ID of the first PDU session.

According to various embodiments, a second identifier (ID) of the second PDU session may be generated to be different from a first ID of the first PDU session, and the PDU session establishment request message or the PDU session establishment accept message may include mapping information including a mapping relationship between the first ID and the second ID.

According to various embodiments, the PDU session establishment request message and the PDU session establishment request message may be transmitted by using non-access stratum (NAS) signaling, and the PDU session establishment request message may be transmitted via an evolved NodeB (eNB) or a 5th generation Node B (gNB) of the 3GPP access when the first PDU session is the 3GPP access, and the PDU session establishment request message may be transmitted via a non-3GPP inter-working function (N3IWF) when the first PDU session is the non-3GPP access.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While specific embodiments have been described in the detailed descriptions of the disclosure, it will be understood by those skilled in the art that various changes may be made therein without departing from the spirit and scope of the disclosure. Therefore, the scope of the disclosure should be defined not by the described embodiments but by the appended claims or the equivalents to the claims.

The invention claimed is:

1. A method performed by a user equipment (UE) in a wireless communication system, the method comprising:

transmitting, to an access and mobility management function (AMF) entity, an uplink (UL) non-access stratum (NAS) transport message including first information on a request type for the UL NAS transport message and second information on a payload container for the UL NAS transport message, wherein the request type includes a multi access-protocol data unit (PDU) request and the payload container includes a PDU session establishment request message, wherein the PDU session establishment request message for a first access includes a PDU session identity (ID) of a multi access-PDU session established on a second access, wherein the first information on the request type includes 3 bits, and wherein, in case that each bit of the 3 bits is 1, 1, and 0, the request type indicates the multi access-PDU request.

2. The method of claim 1, wherein the multi access-PDU session is associated with a 3rd generation partnership project (3GPP) access and a non-3GPP access.

3. The method of claim 1, wherein the multi access-PDU session is related to access traffic steering, switching, splitting (ATSSS).

4. A method performed by an access and mobility management function (AMF) entity in a wireless communication system, the method comprising:

receiving, from a user equipment (UE), an uplink (UL) non-access stratum (NAS) transport message including first information on a request type for the UL NAS transport message and second information on a payload container for the UL NAS transport message, wherein the request type includes a multi access-protocol data unit (PDU) request and the payload container includes a PDU session establishment request message, wherein the PDU session establishment request message for a first access includes a PDU session identity (ID) of a multi access-PDU session established on a second access, wherein the first information on the request type includes 3 bits, and wherein, in case that each bit of the 3 bits is 1, 1, and 0, the request type indicates the multi access-PDU request.

5. The method of claim 4, wherein the multi access-PDU session is associated with a 3rd generation partnership project (3GPP) access and a non-3GPP access.

6. The method of claim 4, wherein the multi access-PDU session is access traffic steering, switching, splitting (ATSSS).

7. A user equipment (UE) in a wireless communication system, the UE comprising:
a transceiver; and
at least one processor coupled with the transceiver and configured to:
transmit, to an access and mobility management function (AMF) entity, an uplink (UL) non-access stratum (NAS) transport message
including first information on a request type for the UL NAS transport message and second information on a payload container for the UL NAS transport message,
wherein the request type includes a multi access-protocol data unit (PDU) request and the payload container includes a PDU session establishment request message,
wherein the PDU session establishment request message for a first access includes a PDU session identity (ID) of a multi access-PDU session established on a second access,
wherein the first information on the request type includes 3 bits, and
wherein, in case that each bit of the 3 bits is 1, 1, and 0, the request type indicates the multi access-PDU request.

8. The UE of claim 7, wherein the multi access-PDU session is associated with a 3rd generation partnership project (3GPP) access and a non-3GPP access.

9. The UE of claim 7, wherein the multi access-PDU session is related to access traffic steering, switching, splitting (ATSSS).

10. An access and mobility management function (AMF) entity in a wireless communication system, the AMF entity comprising:
a transceiver; and
at least one processor coupled with the transceiver and configured to:
receive, from a user equipment (UE), an uplink (UL) non-access stratum (NAS) transport message
including first information on a request type for the UL NAS transport message and second information on a payload container for the UL NAS transport message,
wherein the request type includes a multi access-protocol data unit (PDU) request and the payload container includes a PDU session establishment request message,
wherein the PDU session establishment request message for a first access includes a PDU session identity (ID) of a multi access-PDU session established on a second access,
wherein the first information on the request type includes 3 bits, and
wherein, in case that each bit of the 3 bits is 1, 1, and 0, the request type indicates the multi access-PDU request.

11. The AMF entity of claim 10, wherein the multi access-PDU session is associated with a 3rd generation partnership project (3GPP) access and a non-3GPP access.

12. The AMF entity of claim 10, wherein the multi access-PDU session is access traffic steering, switching, splitting (ATSSS).

13. The method of claim 1, further comprising:
receiving, from the AMF entity, a PDU session establishment response message in response to the PDU session establishment request message,
wherein the PDU session establishment response message includes the PDU session ID, and
wherein a PDU session is established on the first access based on the PDU session ID.

14. The method of claim 4, further comprising:
transmitting, to the AMF entity, a PDU session establishment response message in response to the PDU session establishment request message,
wherein the PDU session establishment response message includes the PDU session ID, and
wherein a PDU session is established on the first access based on the PDU session ID.

15. The UE of claim 7, wherein the at least one processor is further configured to:
receive, from the AMF entity, a PDU session establishment response message in response to the PDU session establishment request message,
wherein the PDU session establishment response message includes the PDU session ID, and
wherein a PDU session is established on the first access based on the PDU session ID.

16. The AMF entity of claim 10, wherein the at least one processor is further configured to:
transmit, to the AMF entity, a PDU session establishment response message in response to the PDU session establishment request message,
wherein the PDU session establishment response message includes the PDU session ID, and
wherein a PDU session is established on the first access based on the PDU session ID.

* * * * *